United States Patent
Ikezawa et al.

(10) Patent No.: US 6,359,684 B2
(45) Date of Patent: *Mar. 19, 2002

(54) LENS SPECIFYING DEVICE

(75) Inventors: Yukio Ikezawa; Takeyuki Kato; Eiichi Yanagi, all of Tokyo (JP)

(73) Assignee: Kabushiki Kaisha TOPCON, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/381,294
(22) PCT Filed: Jan. 22, 1999
(86) PCT No.: PCT/JP99/00224
  § 371 Date: Sep. 22, 1999
  § 102(e) Date: Sep. 22, 1999
(87) PCT Pub. No.: WO99/37985
  PCT Pub. Date: Jul. 29, 1999

(30) Foreign Application Priority Data

Jan. 22, 1998 (JP) ............................................. 10-009996

(51) Int. Cl.$^7$ ................................................ G01B 9/00
(52) U.S. Cl. ...................................................... 356/124
(58) Field of Search ................................ 356/124, 125, 356/127, 126

(56) References Cited

U.S. PATENT DOCUMENTS

| | | | |
|---|---|---|---|
| 5,489,978 A | * 2/1996 | Okumura et al. | 356/124 |
| 5,657,116 A | 8/1997 | Kohayakawa | |
| 5,682,234 A | * 10/1997 | Kajino | 356/124 |
| 5,971,537 A | * 10/1999 | Fukuma et al. | 356/124 |

FOREIGN PATENT DOCUMENTS

| | | |
|---|---|---|
| EP | 0 454 154 | 10/1991 |
| GB | 844933 | 8/1960 |
| JP | 7-234172 | 9/1995 |
| JP | 8-122211 | 5/1996 |

OTHER PUBLICATIONS

Patent Abstracts of Japan, vol. 1997, No. 04, Apr. 30, 1997, JP 08 334434, Dec. 17, 1996.

Patent Abstracts of Japan, vol. 1996, No. 09, Sep. 30, 1996, JP 08 122211, May 17, 1996.

* cited by examiner

Primary Examiner—Frank G. Font
Assistant Examiner—Layla Lauchman
(74) Attorney, Agent, or Firm—Oblon, Spivak, McClelland, Maier & Neustadt, P.C.

(57) ABSTRACT

A lens specifying apparatus comprising a light source (21) for projecting a measuring light beam on a lens (30) under examination, an area CCD (35) image receiving element for receiving the measuring light beam transmitted by the lens (30) under examination, a filter disc (64) disposed, as means for providing spectral transmittances, at a midpoint of an optical path extending from the light source (21) to the area CCD (35), and a processing circuit (37) for calculating the refractive characteristics and spectral transmittances of the lens (30) under examination on the basis of an output of the area CCD (35) and displaying the refractive characteristics and spectral transmittances on a monitor (3).

11 Claims, 26 Drawing Sheets

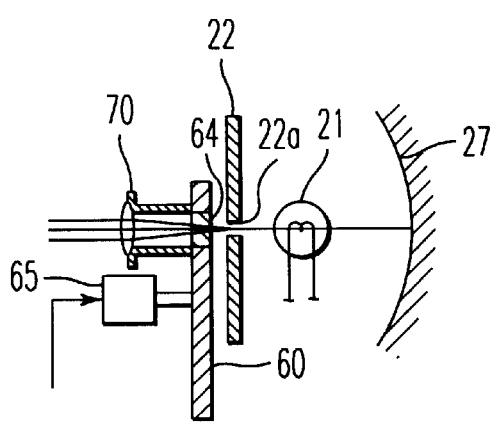
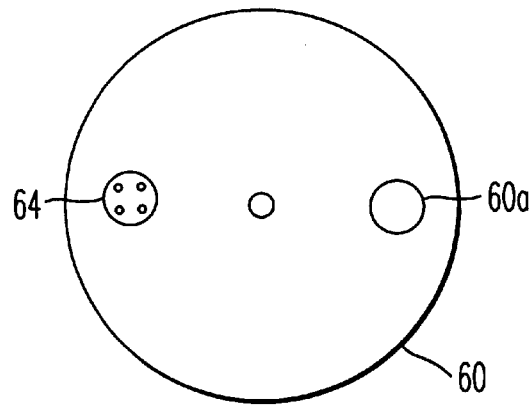
*FIG. 7a*  *FIG. 7b*
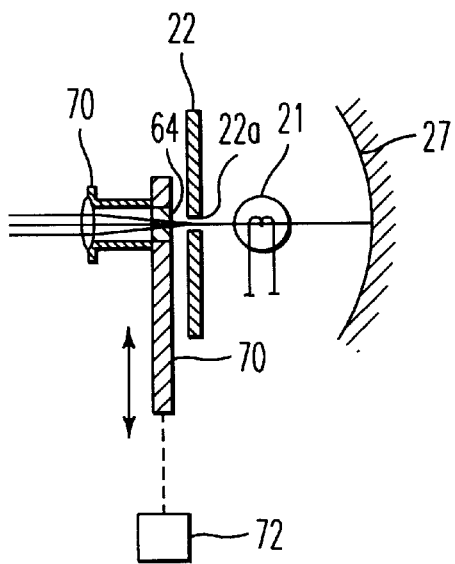
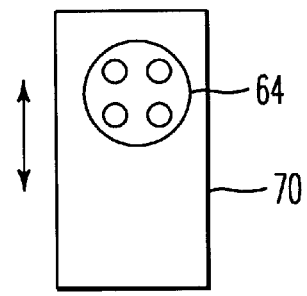
*FIG. 7c*  *FIG. 7d*

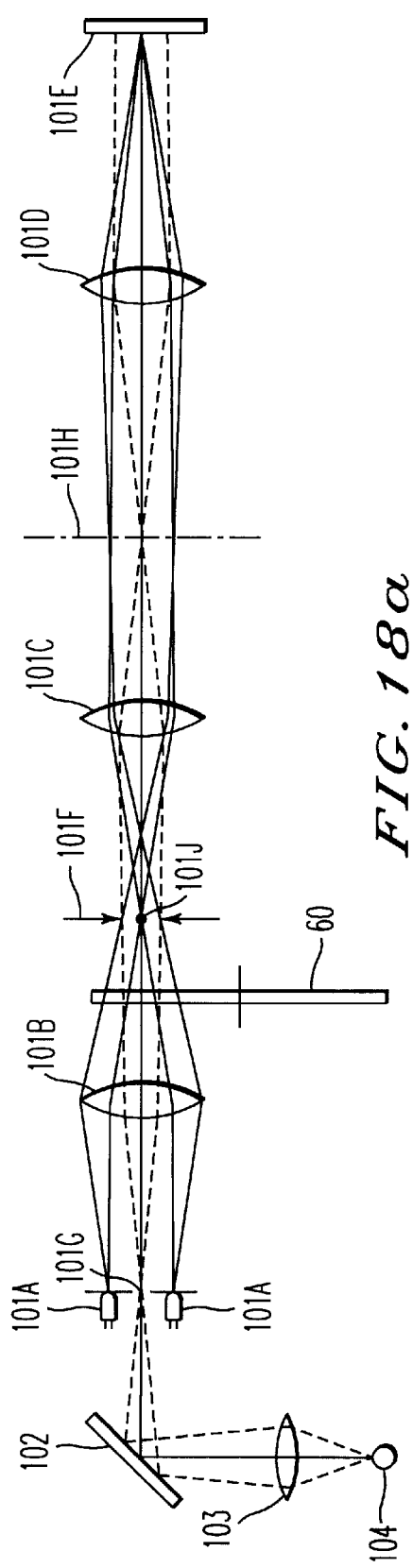
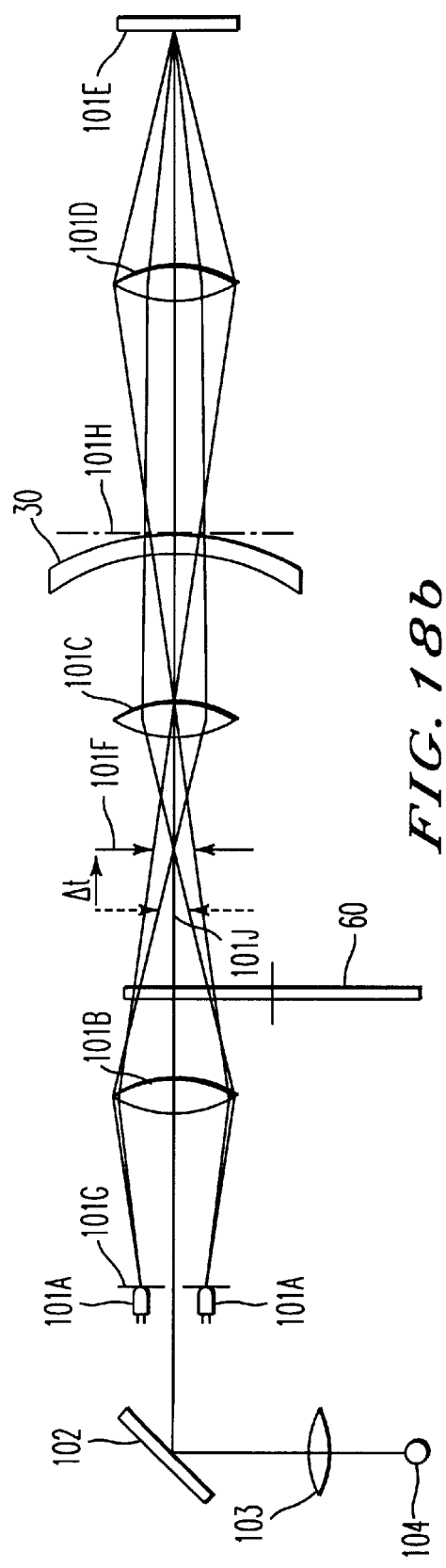
FIG. 18a
FIG. 18b

3a

| R |

S: −3.00          S: −3.00
C: +00.00         C: +00.00
A: +180           A: +180
P:   1.0 U        P:   1.5 U
 :   0.5 I         :   2.0 I

UPPER SPECTRAL       UPPER SPECTRAL
TRANSMITTANCE        TRANSMITTANCE

UVB 3.0%             UVB 3.0%

UVA 5.0%             UVA 5.0%

VISIBLE 70%          VISIBLE 98%

*FIG. 23*

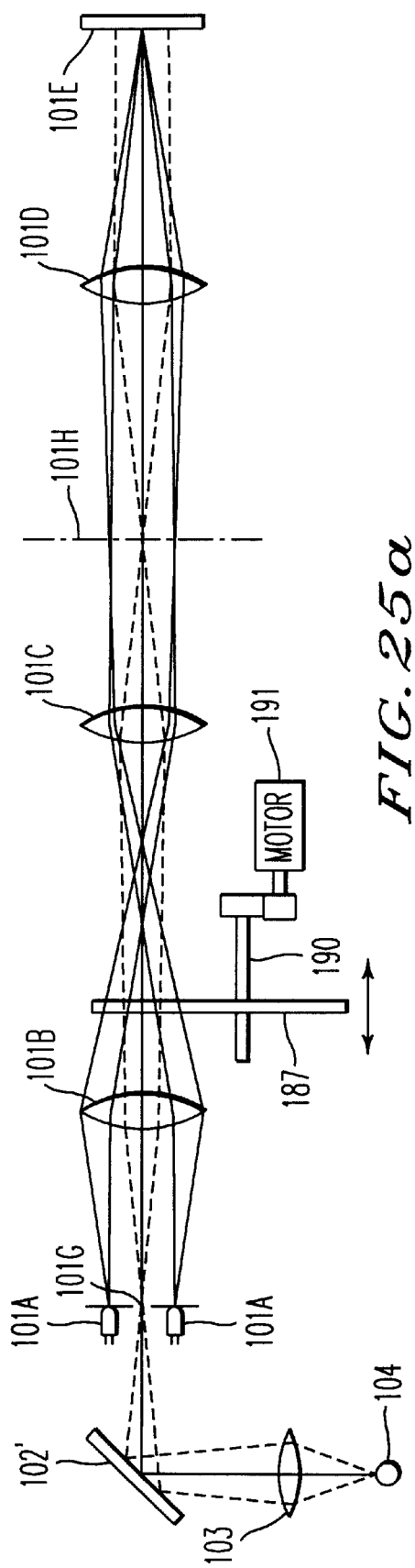
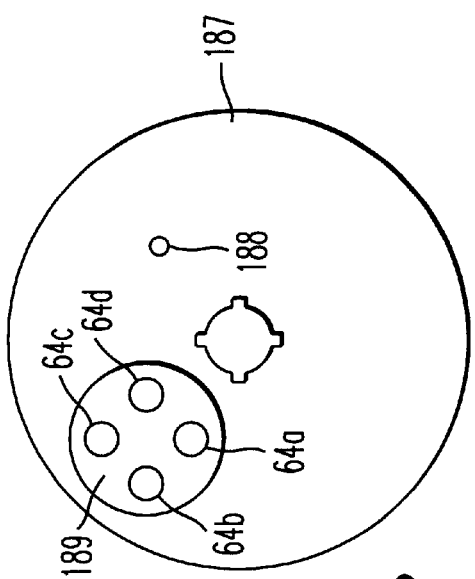
FIG. 25a
FIG. 25b

LENS SPECIFYING DEVICE

TECHNICAL FIELD

The present invention relates to a lens specifying apparatus for measuring the spectral transmittances of a lens under examination and displaying the measured spectral transmittances.

BACKGROUND ART

There are various eyeglass lenses including ones of colored type, anti-surface-reflection type, flaw-free-coating covered type, and UV (ultraviolet ray) cut-off type which cuts off an ultraviolet ray harmful to eyes.

If one of the lenses in the right and left lens frames of eyeglasses is broken, it is desirable to fit a lens of the same type as the unbroken lens in one of the lens frames.

However, it was difficult to know the characteristics of the unbroken lens, i.e., the spectral transmittances thereof at a mere sight of the unbroken lens.

It is therefore an object of the present invention to provide a lens specifying apparatus capable of easily and promptly measuring the spectral transmittances of a lens.

DISCLOSURE OF THE INVENTION

To attain the object, the present invention provides as defined in claim 1 an apparatus including lens measuring means having a measurement optical system for measuring a refractive characteristic of a lens under examination, the apparatus comprising: spectral characteristic measuring means having apart of an optical path in common with the measurement optical system of the lens measuring means and measuring a spectral transmittance of the lens under examination; and display means for displaying the spectral transmittance of the lens under examination measured by the spectral characteristic measuring means.

OPERATION

With the above mentioned arrangement, the present invention as defined in claim 1 enables the spectral transmittances of a lens under examination to be measured easily and promptly by utilizing the optical path of the measurement optical system of the lens.

BRIEF DESCRIPTION OF THE DRAWINGS

FIG. 7(a) is a partial explanatory view showing the optical system having another filter disc, FIG. 7(b) is an explanatory view illustrating the filter disc of FIG. 7(a), FIG. 7(c) is a partial explanatory view showing the optical system having another filter disc, and FIG. 7(d) is a view illustrating the filter plate of FIG. 7(a);

FIG. 18(a) is an explanatory view showing the placement of an optical system according to a third embodiment and FIG. 18(b) is an explanatory view showing the case where a lens to be examined is placed at a placement position;

FIG. 23 is an explanatory view showing an example of display on a monitor screen;

FIG. 25(A) is an explanatory view showing the placement of an optical system in still another example of the fourth embodiment and FIG. 25(B) is an explanatory view illustrating a rotating plate;

BEST MODES FOR IMPLEMENTING THE INVENTION

Figure 1:
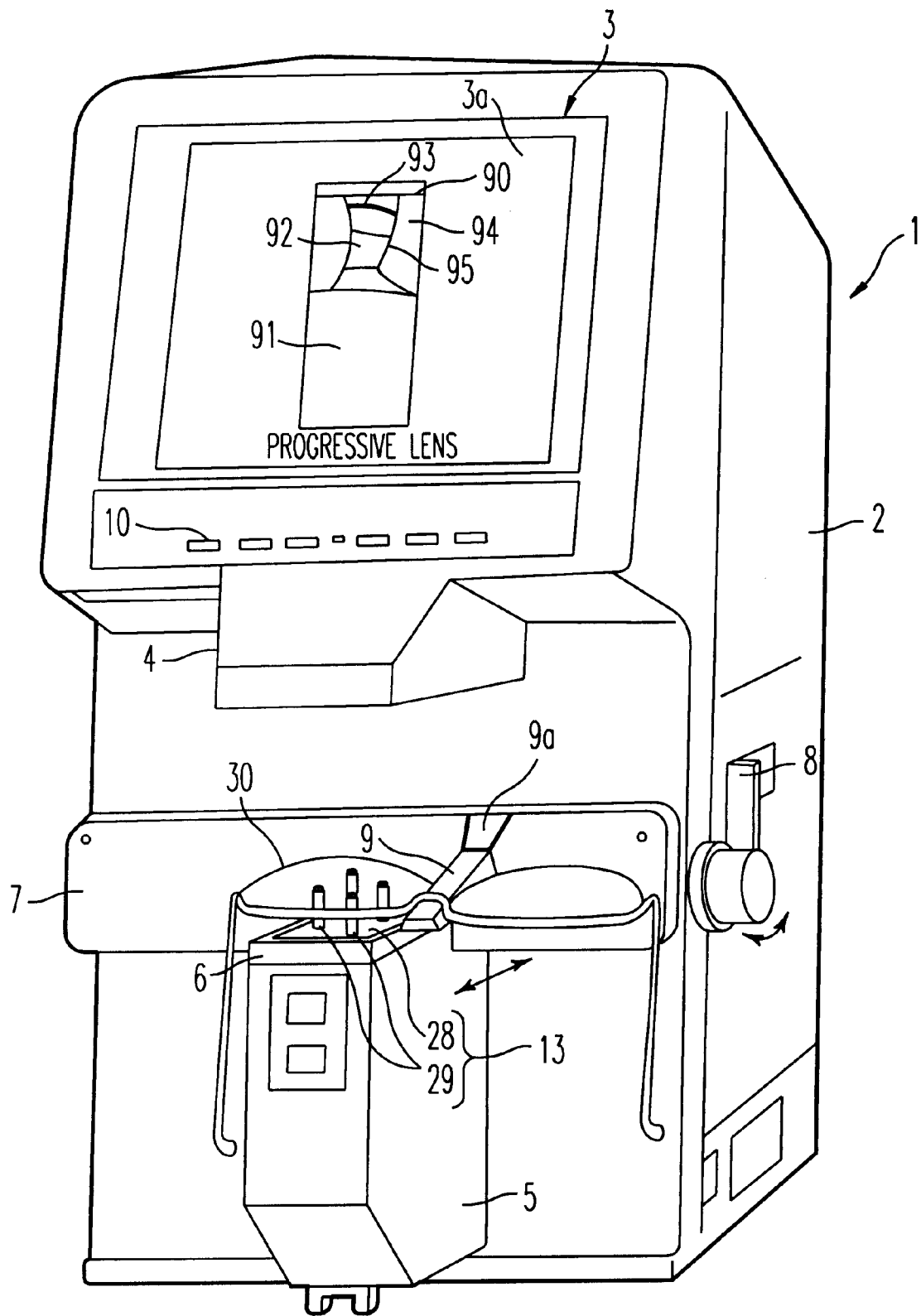
FIG. 1 is an explanatory view illustrating a lens meter as a lens specifying apparatus according to the present invention.
Figure 2:
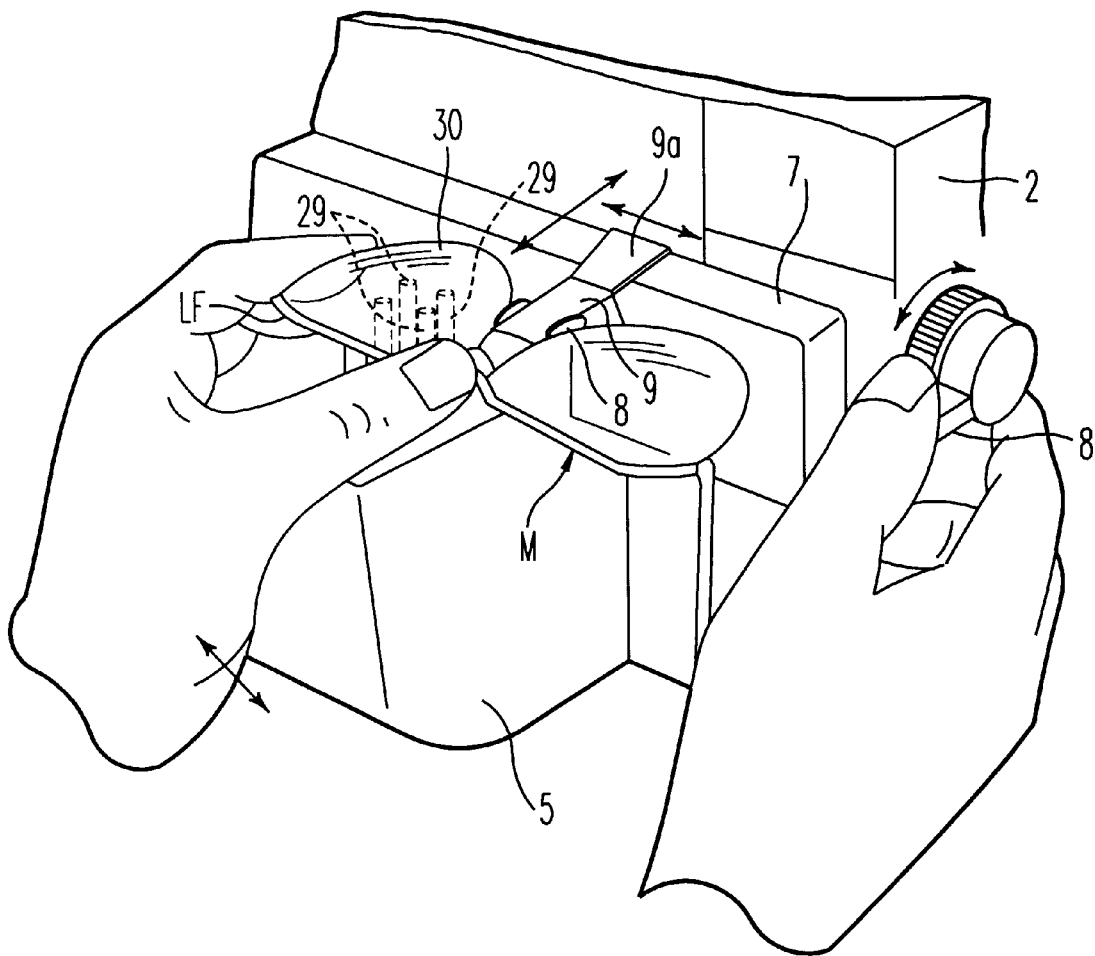
FIG. 2 is a partially enlarged view illustrating the lens meter shown in FIG. 1 when it is used.

Referring now to the drawings, the embodiments of a lens specifying apparatus in accordance with the present invention will be described.

<First Embodiment>

In FIG. 1, 1 is a lens meter as the lens specifying apparatus, 2 is a main body of the lens meter 1; 3 is a monitor (display means) such as a CRT or a liquid crystal display provided in the upper part of the main body 2; 3a is a display screen (display element) of the monitor 3; 4 is an upper optical component container provided on the front side of the main body 2; 5 is a lower optical component container located under the upper optical component container; 6 is a lens receiving table provided on the upper end of the lower optical component container 5; 7 is a lens rest located between the two containers 5, 6 and held on the front side of the main body 2 to have its fore-and-aft position adjustable; and 8 is a lever for operating the lens rest which is held on the side of the main body 2 pivotably in the fore-and-aft direction. The fore-and-aft position of the lens rest 7 is adjustable by pivoting the lever 8 in the fore-and-aft direction.

A slider 9a is held movable in the side-to-side direction along the upper edge of the lens rest 7. A nose pad support member 9 is held vertically pivotable by the slider 9a. The nose pad support member 9 is upwardly biased with a spring not shown and has its upward rotation at a horizontal position regulated. In the case of measuring the refraction characteristic values of a lens SL (30) of eyeglasses M under examination by using the nose pad support member 9, the nose pad B of the eyeglasses M is pressed onto the nose pad support member 9 from above and the nose pad support member 9 is rotated downward, while moved laterally, such that the lens SL (30) under examination is brought into contact with a lens receiver 13 which will be described later. It is to be noted that 10 is a button (switch) for a menu for switching modes or the like.

Figure 3:
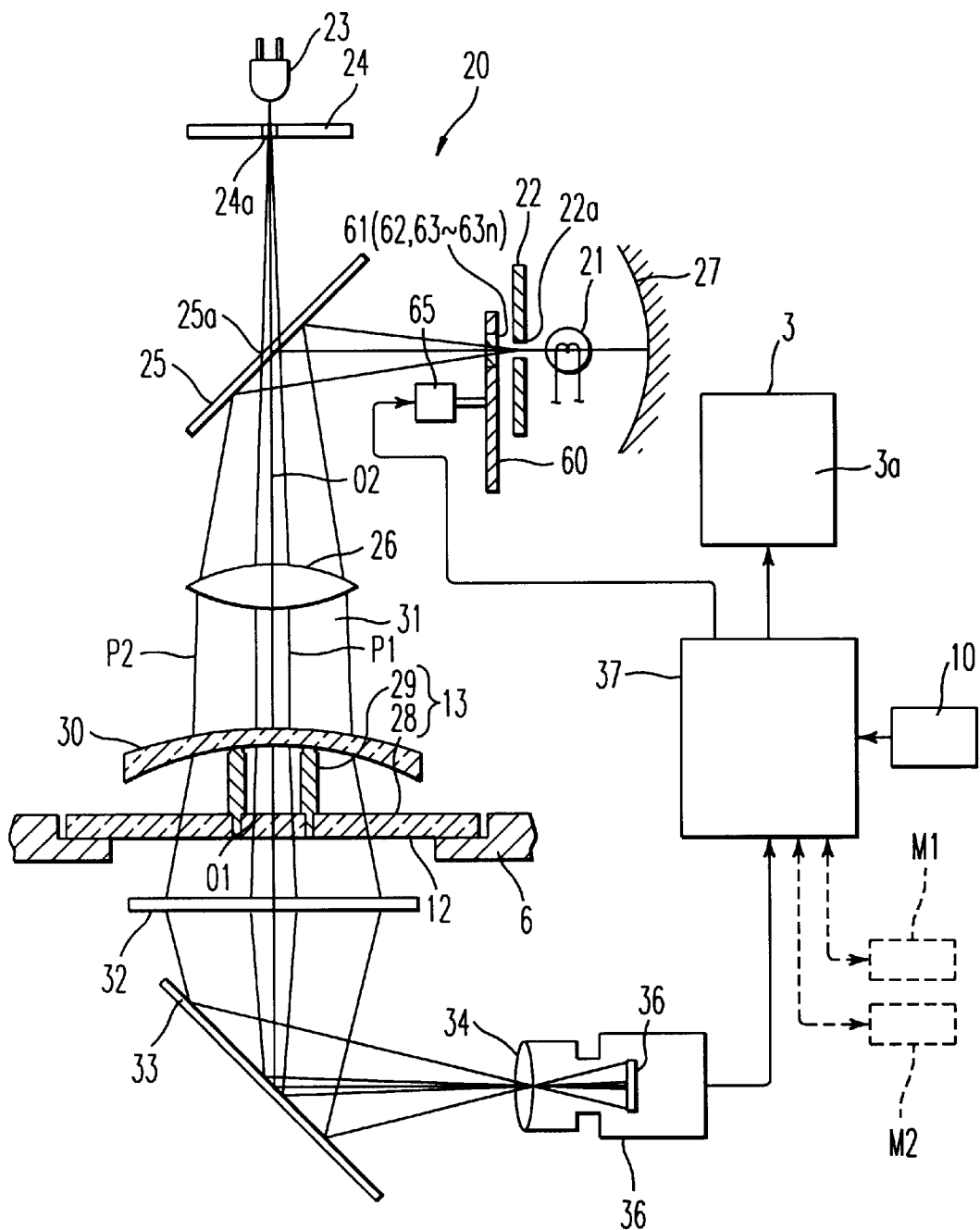
FIG. 3 is an explanatory view showing the optical system of the lens meter shown in FIG 1.

A stepped mounting hole 12 shown in FIG. 3 is formed in the lens receiving table 6 such that the lens receiver 13 is provided in the mounting hole 12. A circular unmachined lens (raw material lens), a machined lens, or an eyeglass lens in an eyeglass frame is set as the lens 30 to be examined in the lens receiver 13.

A measurement optical system shown in FIG. 3 is provided as lens measuring means in the main body 2. The measurement optical system has a light source portion 20 as an illumination optical system and a light receiving optical system.

The light source portion 20 as the illumination optical system has: a light source 21 for generating a measuring luminous flux; a pin-hole plate 22; a filter disc (rotating plate) 60 as means for measuring spectral transmittances (transmission wavelength selecting means); a bored mirror 25; and a collimate lens 26 in this order. The light source portion 20 has: a light source 23 for generating a luminous flux for determining a center position (luminous flux for specifying a position); a pinhole plate 24; an aperture 25a in the bored mirror 25; and the collimate lens 26, Besides, 22a, 24a denote pinholes and 27 denotes a concave mirror for light convergence. The filter disc 60 may also be disposed anterior to the collimate lens 26.

The light receiving optical system has: the lens receiver 13; a screen 32; a mirror 33; and a television camera 36. The lens receiver 13 consists of a pattern plate 28 that is set in the stepped mounting hole 12 of the lens receiving table 6 and a lens receiving pin 29 provided at the center of the pattern plate 28 to protrude therefrom.

The pattern plate 28 is formed with approximately 1000 (numerous) small holes (not shown) for use in measuring a refractive distribution to produce mapping for refractive characteristics. The television camera 36 has an image forming lens 34 and an area CCD (image pickup means) 35 as an image receiving element (light receiving element).

Figure 4:
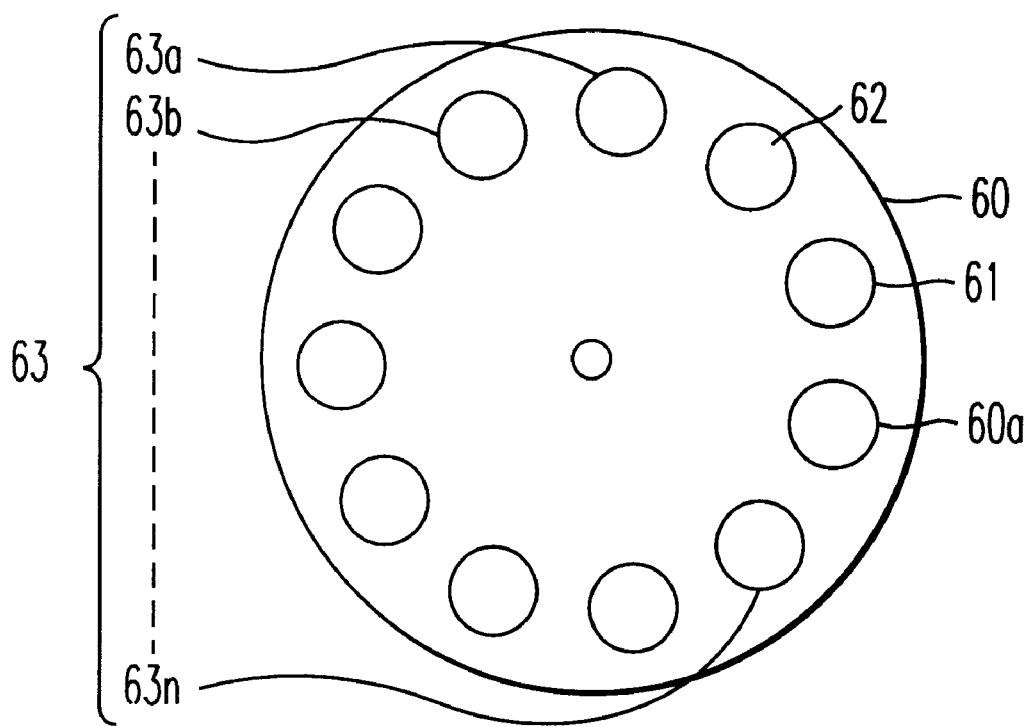
FIG. 4 is an explanatory view illustrating the filter plate of FIG. 3.

As shown in FIG. 4, the filter disc 60 described above is provided with a filter portion 61 which transmits ultraviolet light UVB at wavelengths of 280 to 315 nm and cuts off light at the other wavelengths, a filter portion 62 which transmits ultraviolet light UVA at wavelengths of 315 to 380 nm and cuts off light at the other wavelengths, a filter portion 63 for measuring the spectral transmittance of visible light in the range of 380 to 800 nm, and a transparent hole 60a. The filter portion 63 is further provided with filter portions 63a to 63n capable of selecting stepwise transmission wavelengths between 380 to 800 nm. Such a filter disc 60 is rotatively driven by a drive motor (driving means) 65 such as a pulse motor. Any one of the filter portions 61, 62, and 63a to 63n and the transparent hole (aperture) 60a is inserted in an optical path to be disposed in opposing relation to the pinhole 22. Although it is any one of the filter portions 61, 62, and 63a to 63n and the transparent hole 60a that is thus disposed in opposing relation to the pinhole 22a, FIG. 3 shows reference numerals 61, 62, and 63a to 63n when the filter portion is disposed in opposing relation to the pinhole 22 for the convenience of description.

If the transparent hole 60a is inserted in the optical path and disposed in opposing relation to the pinhole 22, the measurement optical system functions as lens measuring means (lens refractive characteristic measuring means) for measuring the refractive characteristics of a lens under examination. In short, the lens measuring means for measuring the refractive characteristics is a measurement optical system in the absence of the filter portions 61, 62, and 63a to 63n on the optical path.

When one of the filter portions 61, 62, and 63a to 63n is inserted in the optical path and disposed in opposing relation to the pinhole 22, the measurement optical system functions as spectral characteristic measuring means (spectral transmittance measuring means) for measuring the spectral transmittances (spectral characteristics) of a lens under examination. Specifically, the spectral characteristic measuring means for measuring spectral transmittances has one of the filter portions 61, 62, and 63a to 63n inserted in the optical path such that one of the filter portions 61, 62, and 63a to 63n forms a part of the optical path of the measurement optical system. Consequently, the measurement optical system of the lens measuring means for measuring a refractive characteristic and the optical path have a part in common.

Moreover, the optical source 21 described above is composed of a halogen lamp which emits light at wavelengths between the UV and IR regions inclusive. The light source 23 is composed of an LED. In the normal measurement of the refractive characteristic, the transparent hole 60a of the filter disc 60 is disposed in the optical path and a measuring luminous flux at all wavelengths is projected from the light source 21 onto the lens under examination.

The aperture 25a is formed in the bored mirror 25. The pinhole plates 22, 24 are located at the focal point of the collimate lens 26 which serves to convert the luminous flux emitted from the light sources 21, 23 to a parallel luminous flux. Here, the luminous flux generated from the light source 21 is designated at a reference numeral P2 and the luminous flux generated from the light source 23 is designated at a reference numeral P1.

<Effects of First Embodiment>

A description will be given below to the effects of a lens meter with such a structure.

(i) Measurement and Mapping of Refractive Characteristic

As described above, the measurement optical system functions as the lens measuring means (lens refractive characteristic measuring means) for measuring the refractive characteristic of a lens under examination by inserting the transparent hole 60a in the optical path and disposing the transparent hole 60a in opposing relation to the pinhole 22 through rotative driving by the drive motor (driving means) 65 such as a pulse motor.

In this state, the light source 21 is turned on so that the luminous flux from the light source 21 is projected on the lens 30 under examination on the lens receiver 13 via the pinhole 22a of the pinhole plate 22, the mirror 25, and the collimate lens 26. The luminous flux transmitted by the lens 30 under examination is projected on the screen 32 through the small holes of the pattern plate 28. At this time, the luminous flux that has passed through the numerous small holes of the pattern plate 28, which are not shown, is projected on a screen 3 with a spacing varied in accordance with the refractive force of the lens 30 under examination.

Figure 5:
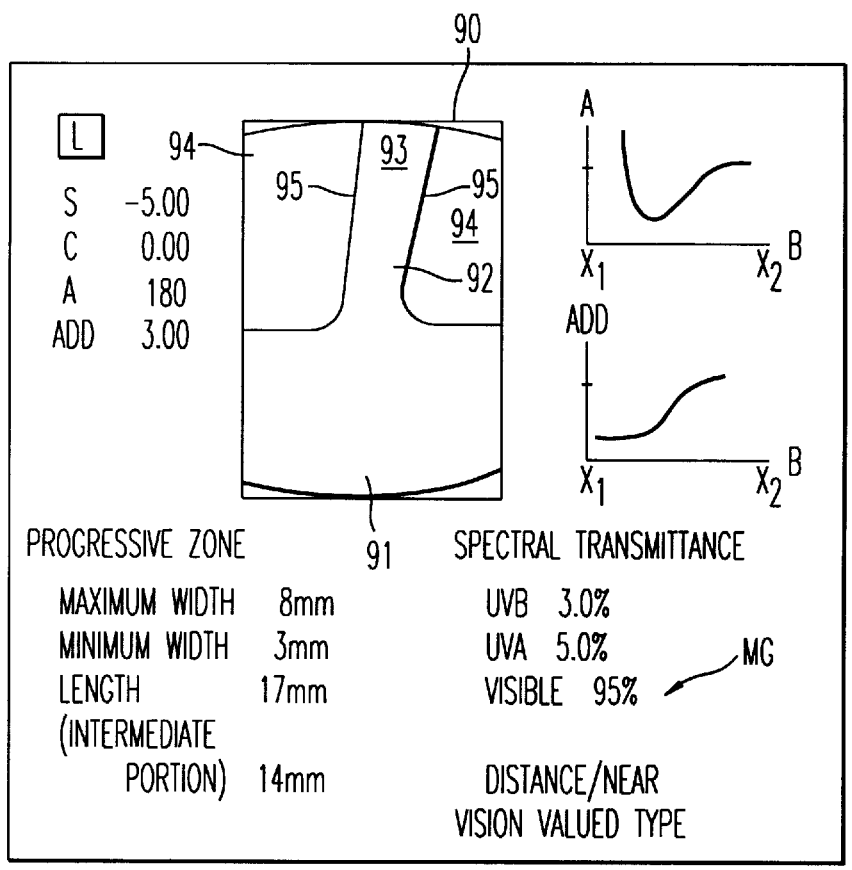
FIG. 5 is an explanatory view showing an example of display of a refractive characteristic image and spectral transmittances on a display device.

The pattern of the small holes projected on the screen 32 is formed into an image at the area CCD 35 of the CCD camera 36 via the mirror 33 and the image forming lens 34. By a processing circuit 37 a mapping process is carried out based on an output of the area CCD 35, whereby the refractive characteristic, such as spherical frequency distribution or cylindrical frequency distribution, of the lens 30 under examination can be mapped. As shown in FIG. 1 or 5, the mapping allows a distance viewing zone 91, a progressive zone 92, a near viewing zone 93, a distorted region 94, and a boundary line 95 to be displayed in a lens configuration 90 on the monitor 3. Since a well-known technique is used in this structure for mapping, the detailed description thereof will be omitted.

(ii) Measurement of Spectral Transmittances

To measure the spectral transmittances of the lens under examination by using the foregoing structure, the filter disc 60 is pivoted by controlling the operation of the drive motor 65 using the processing circuit 37 such that the filter portions 61, 62, and 63a to 63n of the filter disc 60 are disposed successively in the optical path. On the other hand, the light source 21 which is the halogen lamp for emitting light including rays between the UV area and IR area is turned on such that measuring light beams at gradually increasing wavelengths of 280 to 315 nm, 315 to 380 nm, and 380 to 800 nm of the measuring light beam emitted from the light source 21 are sequentially selectively transmitted by the respective filter portions 61, 62, and 63a to 63n of the filter disc 60 and projected on the lens under examination.

Figure 6:
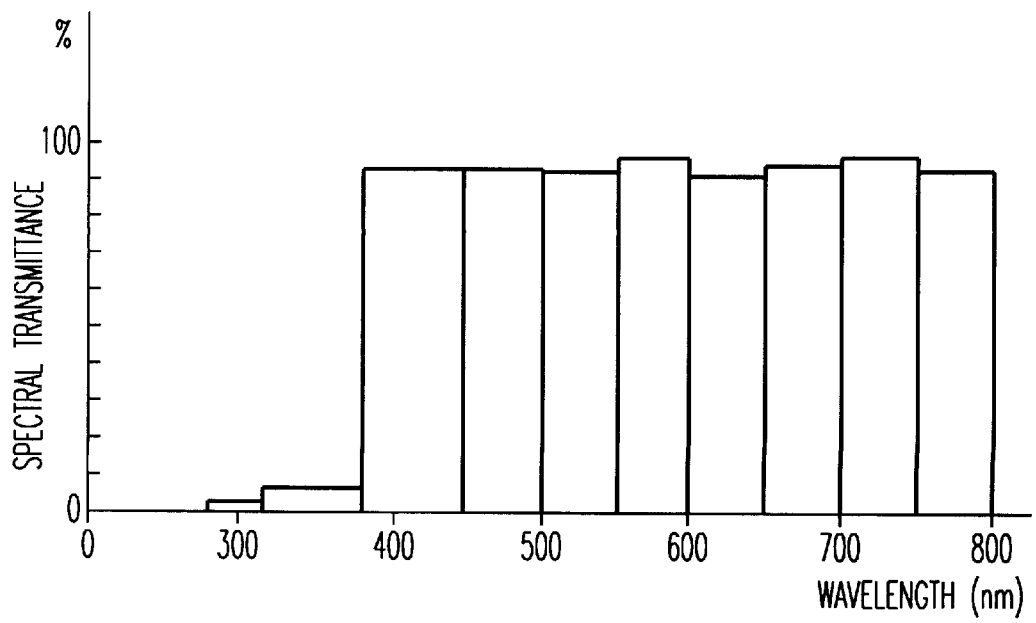
FIG. 6 is an explanatory view showing another example of display of the spectral transmittances.

By the projection, the light beams at gradually increasing wavelengths of 280 to 315 nm, 315 to 380 nm, and 380 to 800 nm are selectively transmitted by the lens under examination and projected on the area CCD 35. Accordingly, the quantity of light transmitted by the lens under examination when the filter portions 61, 62, and 63a to 63n are not used is measured on the basis of an output signal from the area CCD 35 by using measuring light at all wavelengths from the light source 21 to previously obtain an all-wavelength transmitted light quantity for the lens under examination, while the respective quantities of measuring light beams at individual wavelengths which have reached the area CCD 35 are measured on the basis of an output signal from the area CCD 35 to obtain wavelength-by-wavelength transmitted light quantities for the lens under examination. The rates of the wavelength-by-wavelength transmitted light quantities to the all-wavelength transmitted light quantity are calculated and the resulted rates are displayed as a percentage at the UVB, UVA, and visible portions of the screen 3a, as shown in FIG. 5. In the case of visible light, the mean value of the transmittances of the lens under examination at individual wavelengths is displayed. It is also possible to show the spectral transmittances at individual wavelengths as a bar graph, as shown in FIG. 6.

Since a large number of dot images projected on the area CCD 35 are increased or reduced in size depending on the refractive index of the lens under examination, when the quantity of light is measured to obtain the spectral transmittances, the absolute quantity of light of the light dot images projected on the area CCD 35 is measured and compared with the quantity of light when it is not transmitted by the lens under examination. In this case, since the dot images are increased or reduced in size depending on the power of the lens under examination, it is necessary to perform integration or make a correction depending on the power.

By thus obtaining and displaying the spectral transmittances, it is possible to know, whether or not the broken lens is, e.g., a UV (ultraviolet ray) cut-off lens, i.e., a lens with a UV-reflection coating having a spectral transmittance of a certain percentage, the percentage of the spectral transmittance of visible light attributable to the coating. By thus knowing the light transmittance of the lens attributable to the coating on a wavelength-by-wavelength basis, the adoption of a lens with a coating having a spectral transmittance of the same percentage can easily be determined in prescribing the other lens. As a result, even when one of the right and left eyeglass lenses is broken and the other lens is also to be replaced, the powers of the right and left lenses can be best balanced through comprehensive determination including not only the determination of the configuration of the progressive zone of a progressive lens but also the determination of the spectral transmittances as lens data. Even when the upper and lower parts of an eyeglass lens have different spectral transmittances, the upper and lower spectral transmittances can be measured simultaneously for easy determination.

Figure 8:
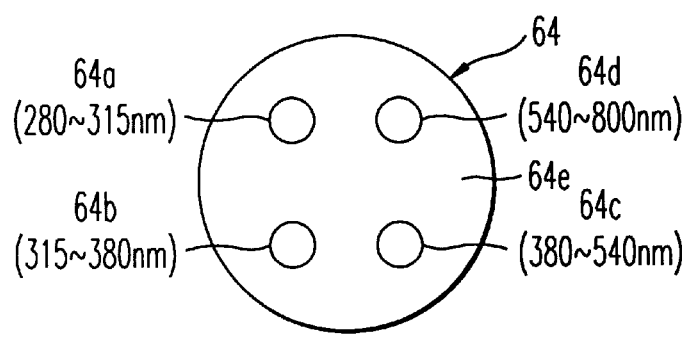
FIG. 8 is an enlarged explanatory view illustrating the principal portion of FIG. 7.

Although the foregoing embodiment has measured the spectral transmittances in the visible wavelength range by sequentially selecting the filter portions 63a to 63n provided in the filter disc 60, the present invention is not limited thereto. For example, it is also possible to divide wavelengths of 280 to 800 nm between the UV and visible regions inclusive into four wavelength ranges and provide the filter disc 60 with a filter portion 64 for transmitting light in the four wavelength ranges as transmission wavelength selecting means, as shown in FIG. 7(b). In this case, the filter portion 64 has four filter portions (filters) 64a, 64b, 64c, and 64d capable of transmitting light in the four wavelength ranges and a light blocking region 64e for blocking light, as shown in FIG. 8. Moreover, each filter portion 64 is provided with a lens 70 as shown in FIG. 7(a) so that the lens 70 renders the filter portion 64 conjugate with a diffusion plate 32.

Figure 9:
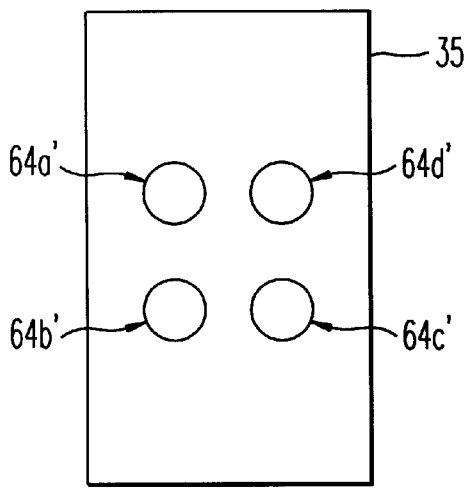
FIG. 9 is an explanatory view illustrating a pattern projected on an area CCD by the filter plate of FIGS. 7 and 8.

In obtaining the spectral transmittances by using the filter portion 64, a set of light dot images 64a' to 64d' regulated by the filter portions 64a to 64d are projected on the area CCD 35, as shown in FIG. 9. From the set of light dot images 64a' to 64d', the spectral transmittances can be obtained simultaneously, as indicated by 64a'' to 64d'' in FIG. 10. It is to be noted that the spectral transmittances 64a'' to 64d'' correspond to the set of light dot images 64a' to 64d', respectively.

Although the filter disc 60 is provided with the filter portion 64 such that the filter portion 64 is inserted in and removed from the optical path by rotating the filter disc 60 by means of the drive motor 65 in the embodiment of FIGS. 7(*a*) and 7(*b*), the present invention is not limited thereto. For example, it is also possible to insert and remove a filter plate 71 provided with the filter portion 64 in and from the optical path by means of a solenoid 72, as shown in FIGS. 7(*c*) and 7(*d*).

According to this embodiment, since the spectral transmittances of the lens 30 under examination are obtained by measurement by commonly using the optical path of the measurement optical system, the lens 30 under examination need not be placed again on another member for the measurement of the spectral transmittances. As a result, switching between the measurement of the refractive characteristics of the lens 30 under examination and the measurement of the spectral transmittances thereof can be performed instantaneously, resulting in easier measurement. Moreover, since the area CCD 35 is also used commonly, smaller size and light weight are achievable.

In measuring the spectral transmittances, if dots are printed by using a dot printer not shown, the sites at which the spectral transmittances were measured can be recognized. It is also possible to store prism values in the X and Y directions at the sites at which the spectral transmittances were measured such that the sites can be specified.

<Second Embodiment>

Figure 11:
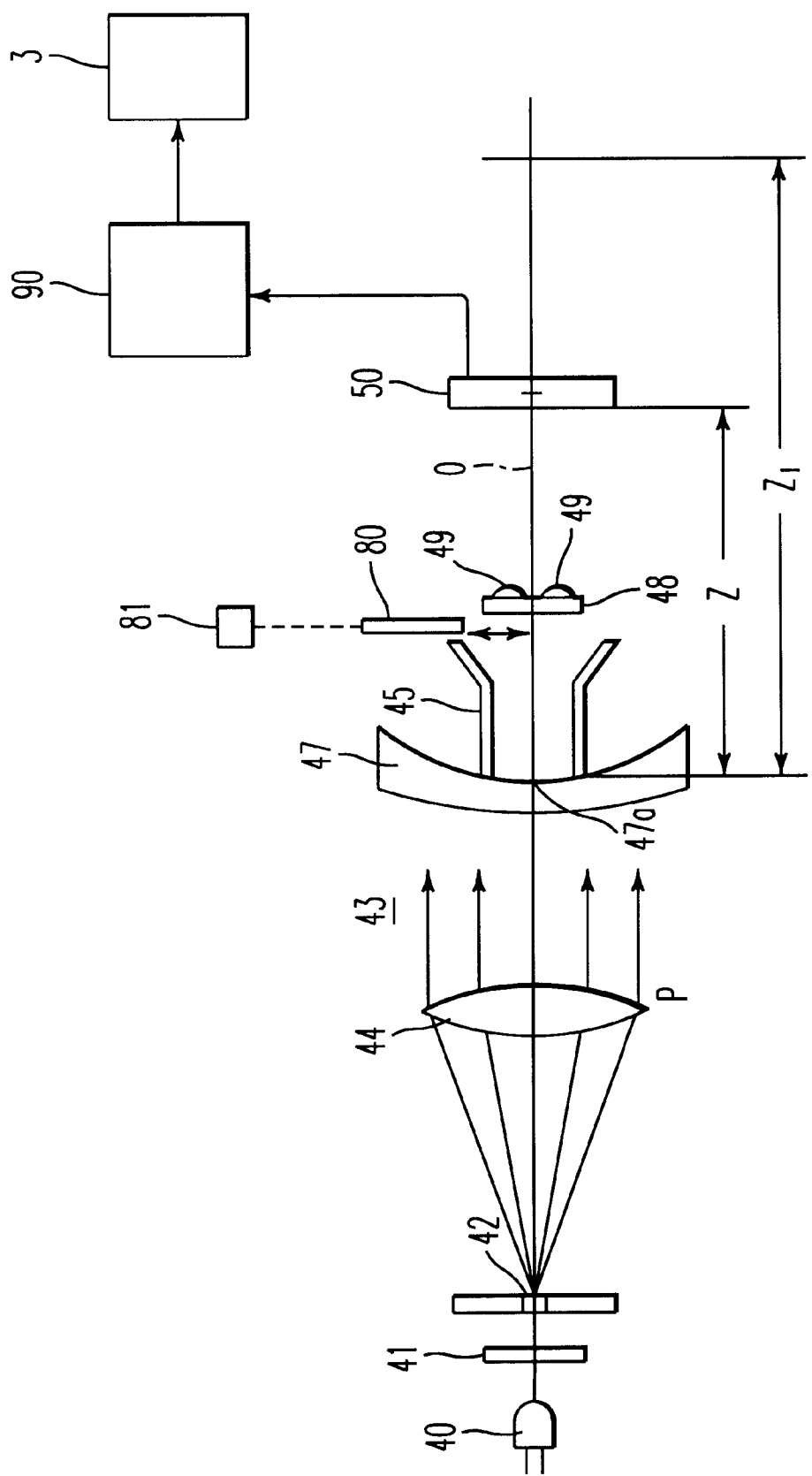
FIG. 11 is an explanatory view showing another example of the lens meter as the lens specifying apparatus according to the present invention.

In FIG. 11, 40 is an LED, 41 is a diffusion plate, and 42 is a pinhole. The LED 40, the diffusion plate 41, and the pinhole 42 constitute a light source portion for generating a measuring luminous flux. The pinhole 42 functions as a diffusive secondary point light source.

The luminous flux emitted from the pinhole 42 is converted into a parallel luminous flux by a collimate lens 44 provided in a projection light path 43. The projection light path 43 is provided with a lens receiver 45 in which a lens 47 to be examined is set. Although the lens receiver 45 has a diameter of about 8 φ (mm) when the lens 47 to be examined is an eyeglass lens, it is replaced with a lens receiver 45 with a diameter of about 5 φ (mm) when a contact lens is set as the lens 47 to be examined.

Figure 12A:
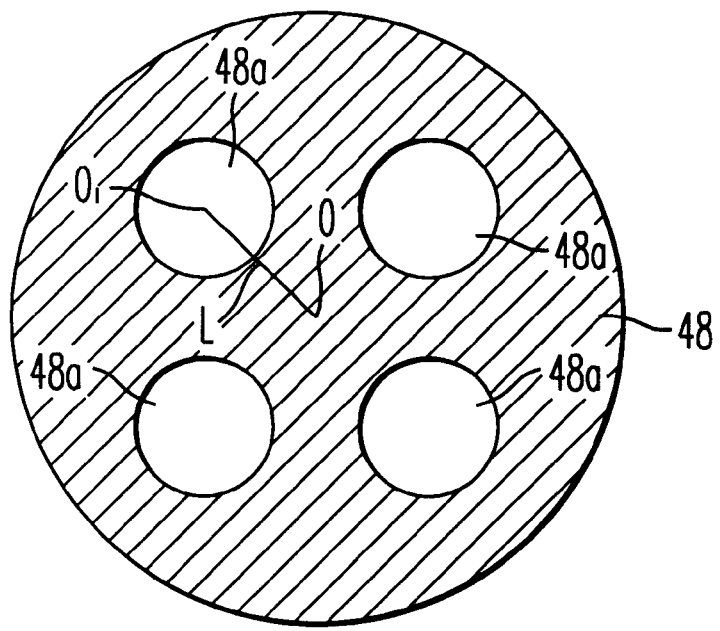
FIG. 12(a) is an explanatory view illustrating a pattern for measuring optical characteristics of FIG. 11
Figure 12B:
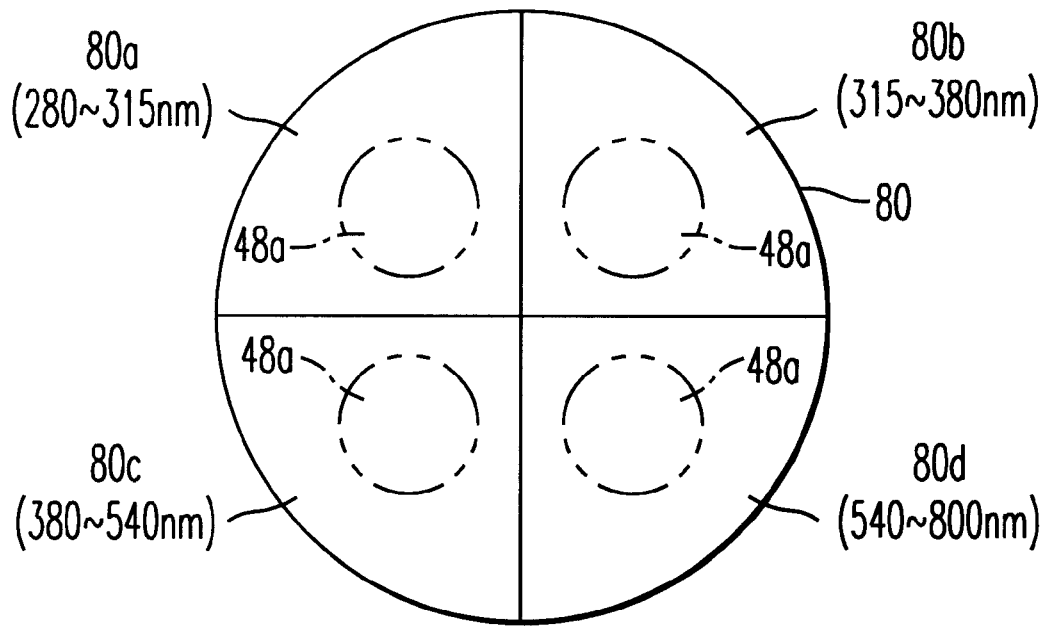
FIG. 12(b) is an explanatory view illustrating the filter plate for measuring the spectral characteristics of FIG. 11.

As shown in FIG. 12(*a*), a pattern 48 for the measurement of optical characteristics having four apertures 48*a* is provided posterior to the lens receiver 45. The number of the apertures 48*a* may be at least three or more, since the optical characteristic values can be calculated provided that the number of the apertures 48*a* is at least three. If the number of apertures 48*a* is excessively large, a long period of time is required for calculation, so that the four apertures 48*a* are desirable. Here, each of the apertures 48*a* has a circular configuration and the four apertures 48*a* are located at respective positions which are shifted by 90 degrees from the adjacent ones and at equal distances L from a measurement optical axis O. The apertures 48*a* are preferably provided at vertically symmetrical positions to allow the measurement of the lens 47 under examination which is not rotation-symmetric, such as a progressive lens.

As shown in FIG. 11, a filter plate (transmission wavelength selecting means) 80 for measuring spectral characteristics is provided in a state capable of being inserted and removed between the lens receiver 45 and the pattern 48 for the measurement of optical characteristics by means of a solenoid 81. When the filter plate 80 is disposed between the lens receiver 45 and the pattern 48, the filter plate 80 is in close proximity to the pattern (pattern plate) 48 so that the filter plate 80 and the pattern 48 are in general conjugation with the pinhole 42. In addition, the pattern plate 80 is provided with four filter portions 80*a*, 80*b*, 80*c*, and 80*d* which transmit light beams in four wavelength ranges into which wavelengths of 280 to 800 nm between the UV and visible regions inclusive are divided, as shown in FIG. 12(*b*). The filter portion 80*a* transmits light in the wavelength range of 280 to 315 nm. The filter portion 80*b* transmits light in the wavelength range of 315 to 380 nm. The filter portion 80*c* transmits light in the wavelength range of 380 to 540 nm. The filter portion 80*d* transmits light in the wavelength range of 540 to 800 nm.

A converging lens 49 is disposed in each of the apertures 48*a*. The size of the aperture 48*a* is preferably maximized to ultimately approximate the values obtained by measuring the optical characteristics by using an automatic lens meter to the values obtained by measuring the optical characteristics by using a manual lens meter. In the case where the lens 47 to be examined is a contact lens, the size of the circumcircle of the four apertures 18*a* should be 5 mm or less since the aperture of the lens receiver 45 is about 5 φ in size. If the size of the aperture 48*a* is excessively large, the respective centers of gravity of the light dot images cannot be calculated in measuring the lens 47 under examination with a positive strong power since the individual light dot images are in intimate contact with each other. On the other hand, measurement sensitivity is degraded if the distance l between the measurement optical axis O and the center position O1 of the aperture 48*a* is small. Conversely, if the distance l is excessively large, the light dot images extend off the effective area of a two-dimensional light receiving sensor, which will be described later, in the case where the lens 47 under examination has a negative strong power. Therefore, the distance l between the measurement optical axis O and the center position O1 is preferably on the order of 1 mm and the size of the aperture 48*a* is preferably on the order of 1 φ.

As the pattern plate 48 for the measurement of optical characteristics, there may be used, e.g., a glass plate in a gold frame to which a microlens may be secured. Alternatively, there may also be used a mold lens composed of four converging lenses 49 molded i n a single resin or glass plate or a converging lens 49, utilizing the phenomenon of diffraction, which is formed in a glass plate by etching. Preferably, the portion other than the converging lens 49 is shielded by using a substance such as chromium.

An area CCD 50 as the two-dimensional image receiving element is provided posterior to the pattern 48 for the measurement of optical characteristics, The distance Z from the area CCD 50 to the lens receiver, i.e., the distance Z from the two-dimensional image receiving element 50 to the back-side vertex position 47*a* of the lens 47 under examination has been adjusted to be smaller than the back focus distance Z1 obtainable when a lens 47 under examination having the measurable strongest positive power is set in the projection optical path 43. This is for preventing the light dot images from overlapping each other or for preventing the measuring luminous flux transmitted by the lens 47 under examination from being inverted.

Figure 13:
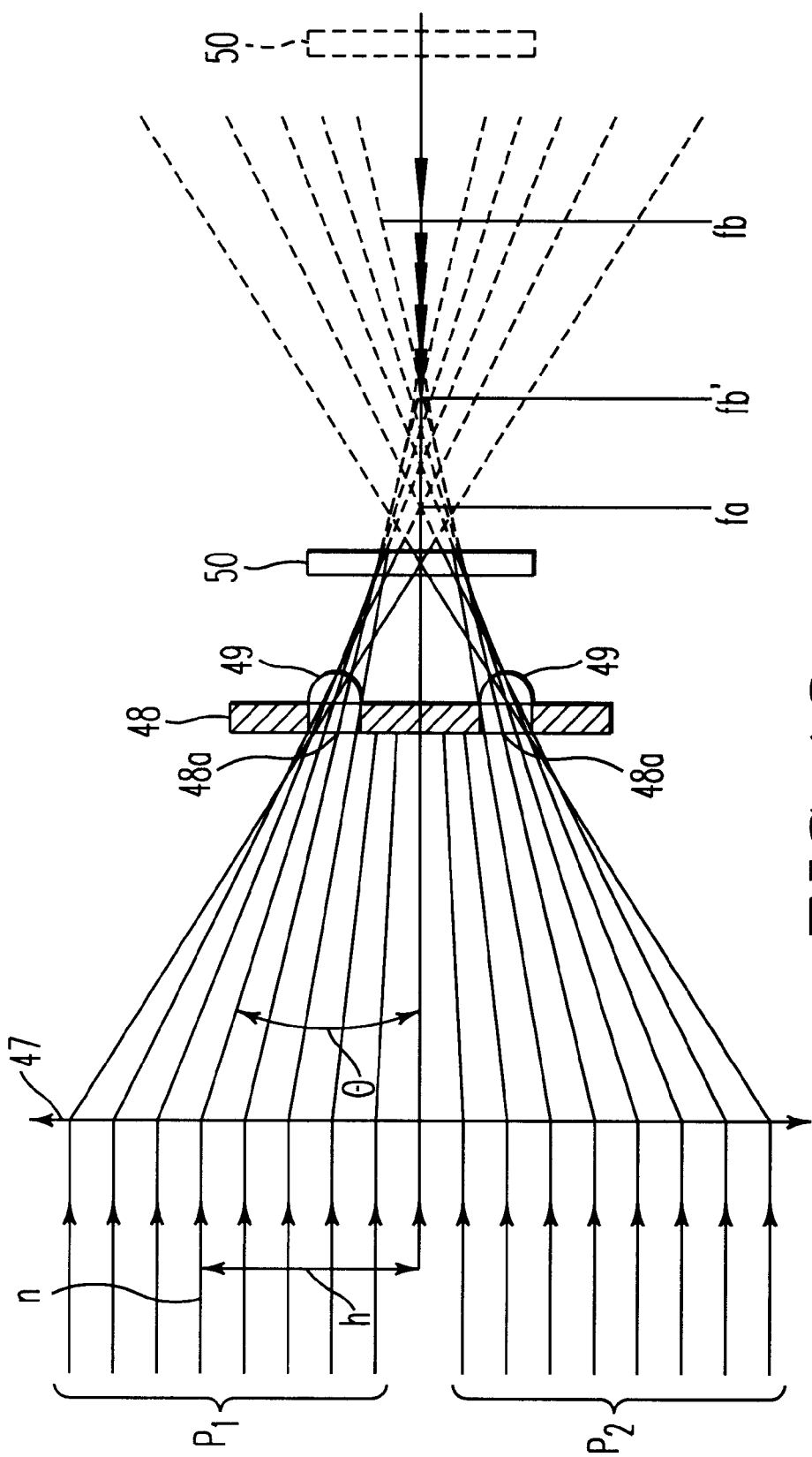
FIG. 13 is an explanatory view showing the effect of the optical system shown in FIG. 11.

Specifically, if the area CCD 50 is provided at the position indicated by the broken line in FIG. 13, a measuring luminous flux. P1 that has passed through the region overlying the lens 47 under examination is formed into an image in the region underlying the area CCD 50 and the measuring luminous flux P2 that has passed through the underlying region is formed into an image in the region overlying the area CCD 50, so that the measuring luminous flux P incurs inversion. Consequently, it becomes impossible to judge to which light dot image on the area CCD 50 the measuring luminous flux P corresponds in passing through the lens 17 under examination.

If the lens 47 under examination which is measurable by means of the automatic lens meter has a measured power of, e.g., ±25 diopters, the back focus distance Z1 is 40 mm, so that the distance Z from the lens receiver 45 to the area CCD 50 is preferably 20 to 30 mm. If the distance Z is set to 20 mm or less, the measurement sensitivity is degraded. However, this is not the case if a relay lens is provided between the lens receiver 45 and the area CCD 40.

If a lens 47 with high measurement frequency, e.g., a lens 47 with a low power (−2.5 D) is set in the projection optical path 43, e.g., settings are preferably made such that the light dot images on the area CCD 50 are minimized in size to render the measurement less susceptible to flaws and contamination.

Figure 14:
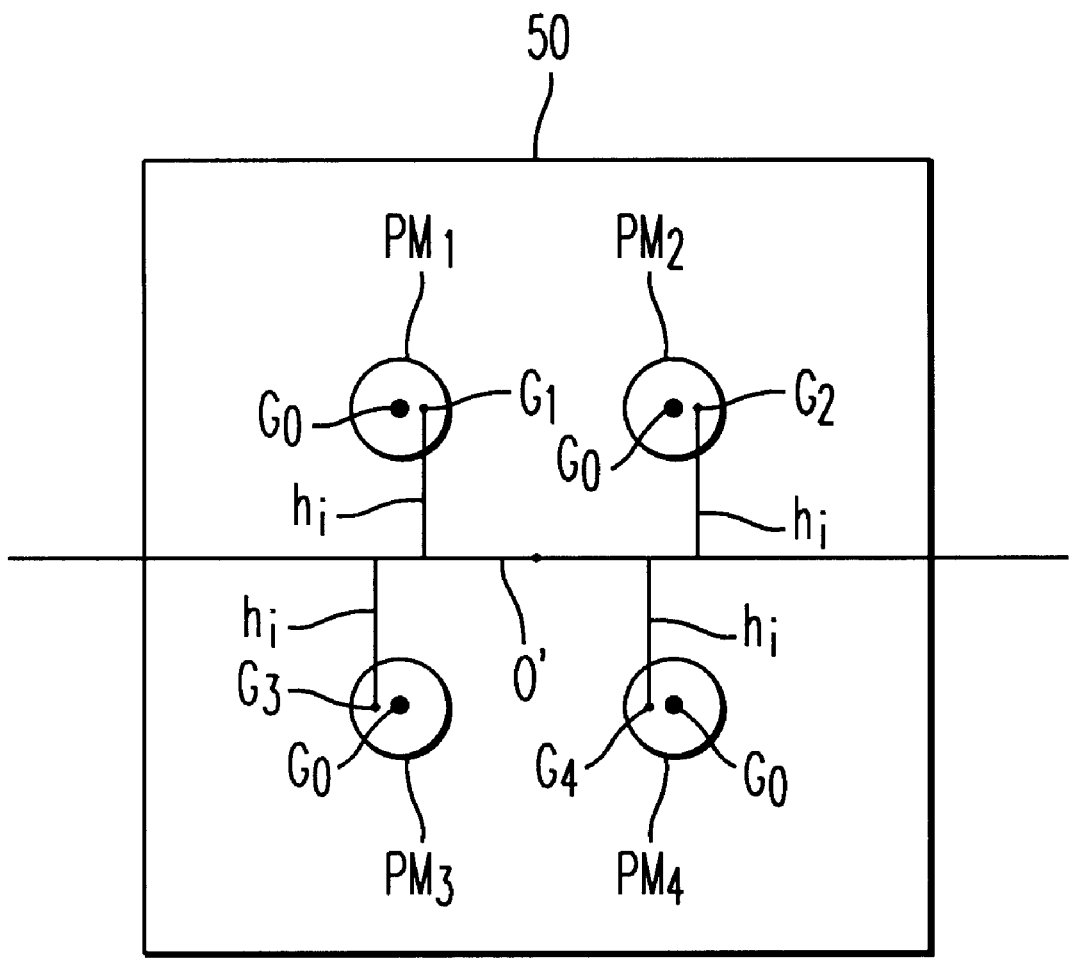
FIG. 14 is an explanatory view showing the relationship between the pattern for optical characteristics shown in FIG. 11 and the area CCD.

A measuring luminous flux n incident upon the lens 47 under examination is polarized after passing through the lens 47 under examination. The degree of polarization is determined by the height h of incidence and the power of the lens 47 under examination at the position of incidence. If the angle of polarization is assumed to be θ, S=tan θ/10 h is satisfied where the height h of incidence is already known. As shown in FIG. 14, if the height from the center line O' on the area CCD 20 is assumed to be hi, θ=(h-hi/z) is satisfied so that the power S of the lens 17 under examination is calculated if the center positions G1 to G4 of gravity are obtainable.

When the lens 47 under examination has a positive power, the spaces between the individual light dot images PM1 to PM4 is reduced. If the lens 47 under examination has a negative power, the spaces between the light dot images PM1 to PM4 are increased, If the lens 47 under examination is a spherical lens, the respective center positions G0 of the light dot images PM1 to PM4 are generally equidistant from the center line O'. If the lens 47 under examination is distorted, however, the distances from the respective center positions G0 of the individual light dot images PM1 to PM4 to the center line O' are different from each other.

In accordance with the present invention, since each of the apertures 48a has been formed to have a maximum size, numerous fine light beams pass through the individual apertures 48a on a one-by-one basis under the influence of aberration of the lens 47 under examination. As a result, each of the center positions G1 to G4 of gravity of the light dot images PM1 to PM4 in the individual apertures 48a is shifted from the center position (center position of gravity) G0 based on one fine light beam when they are formed on the area CCD 20. Accordingly, the obtained power is approximate the power obtainable with the manual lens meter.

Even if a small flaw or slight contamination is present in the local region of the lens 47 under examination through which the measuring luminous flux directed to the apertures 48a passes and the measuring luminous flux directed to the apertures 48a is thereby partially blocked, the degree of blocking is lower than in the case with a fine light beam. As a result, the light dot images PM1 to PM4 are shifted from the center positions G1 to G4 of gravity only slightly, so that a measurement error resulting from dust and contamination is small and measurement accuracy is improved.

Figure 10:
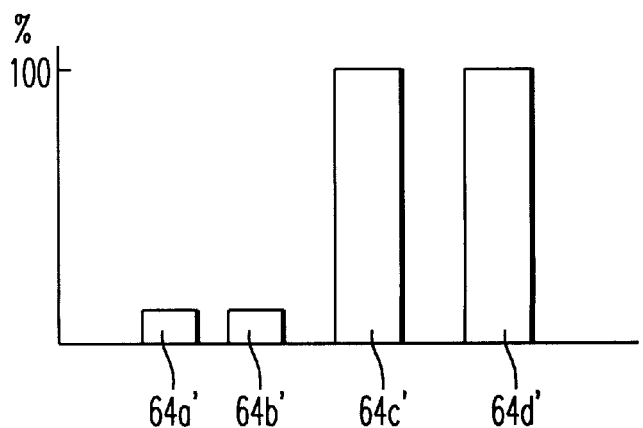
FIG. 10 is an explanatory view showing a spectral transmittance based on an output of the CCD of FIG. 9.

In measuring the spectral characteristics of the lens 47 under examination, the solenoid 81 is actuated to insert the filter plate 80 for the measurement of spectral characteristics between the lens receiver 45 and the pattern 48 so that light dot images PM1 to PM4 as shown in FIG. 14 are formed on the area CCD 50. Output signals from pixels at the respective locations of the light dot images PM1 to PM4 are inputted to a calculation control circuit (processing circuit) 90. The calculation control circuit 90 calculates the spectral transmittances of the lens 47 under examination on the basis of the magnitudes of the output signals from the pixels at the locations of the light dot images PM1 to PM4 and displays the result of calculation on the display screen 3a of the display device 3, as shown in FIG. 10.

<Other Features>

Figure 15:
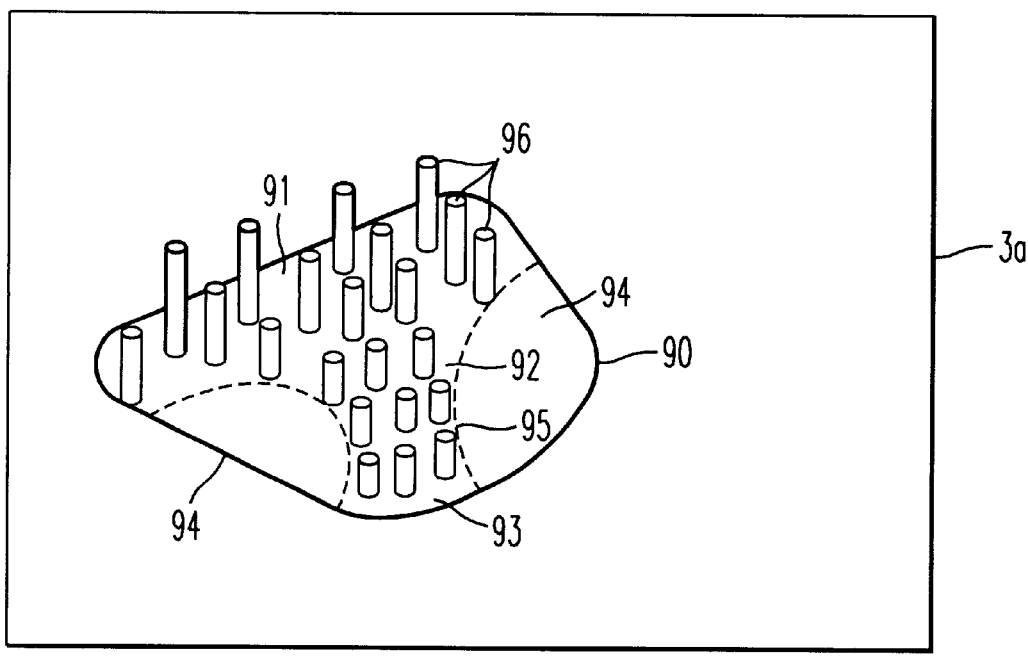
FIG. 15 is an explanatory view showing an example of display of the spectral characteristics.

It is also possible to measure spectral data when the lens under examination is moved continuously in the fore-to-aft and side-to-side directions and display the measured spectral data in a two-dimensional map representation. Alternatively, it is also possible to display in three dimensions a plurality of bars 96 with heights each indicative of a light transmittance in overlapping relation with the lens configuration 90, as shown in FIG. 15.

Figure 16:
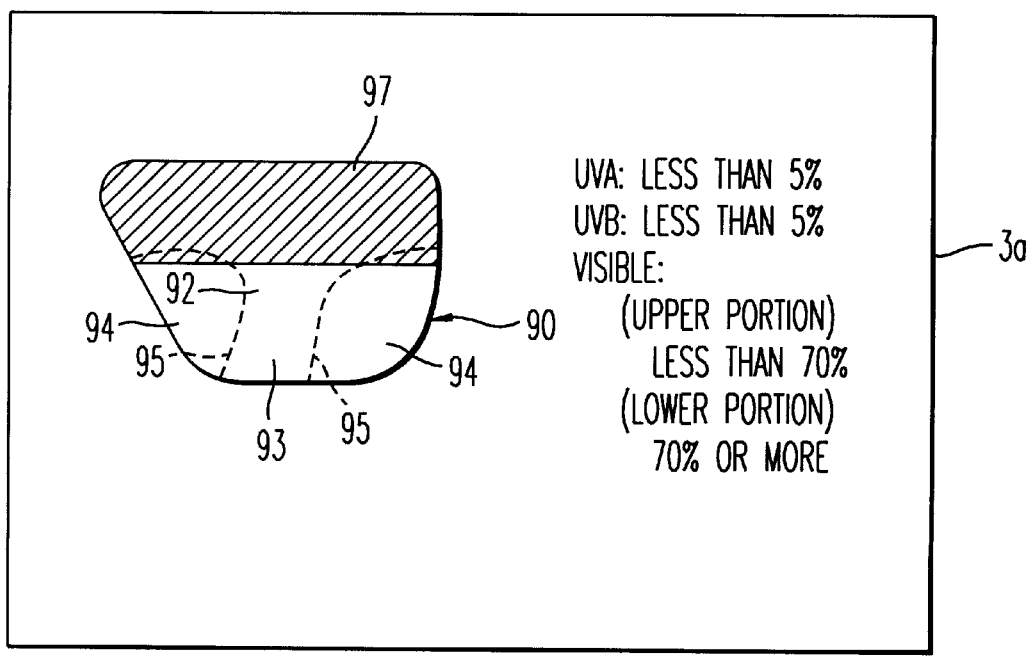
FIG. 16 is an explanatory view showing another example of display of the spectral characteristics.

FIG. 16 shows the case where the spectral transmittances of an eyeglass lens entirely covered with a coating for cutting off an ultraviolet ray UVA at wavelengths of 280 to 315 nm and an ultraviolet ray UVB at wavelengths of 315 to 380 nm and having an upper half portion colored in gray or brown for cutting off visible light are measured and displayed. In FIG. 16, the respective transmittances of UVA and UVB and the transmittances of visible light of the colored portion 97 are displayed laterally to the lens configuration 90, while the colored portion 97 is indicated by the broken lines. In the present embodiment, the transmittances can be determined based on the values measured in the plurality of regions and the regions in which the measured values are less than a specified value can be displayed. For example, the respective transmittances of UVA and UVB are less than 5% and the colored portion 97 with a visible light transmittance of 70% is displayed. Since a gray scale which progressively becomes thinner downwardly is normally provided on the boundary between the upper-half colored portion 97 and the lower-half uncolored portion, the degree of variations in transmittance can also be displayed as a portion with a color variation or with a gray-scale variation.

Figure 17:
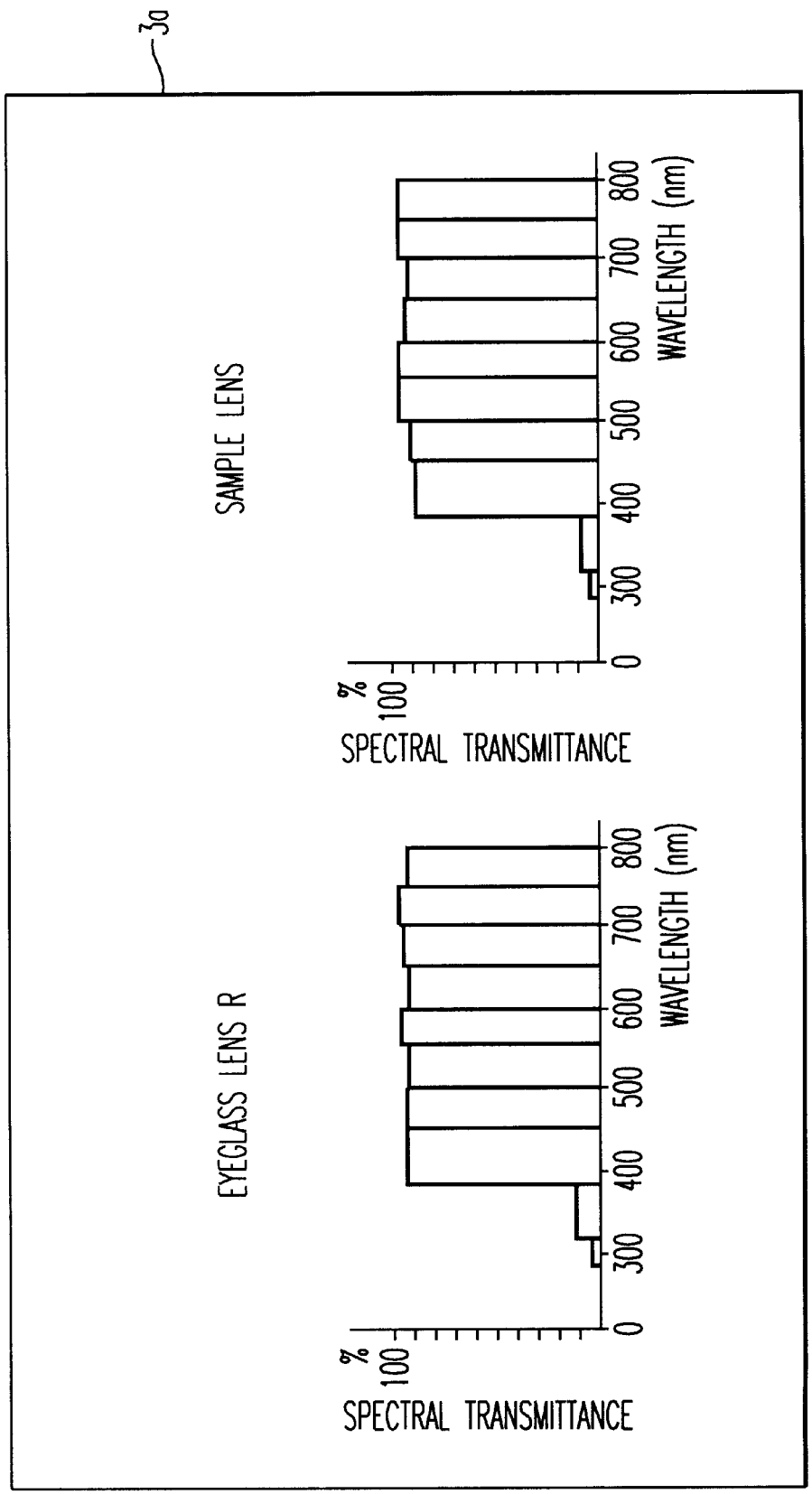
FIG. 17 is an explanatory view showing still another example of display of the spectral characteristics.

In the case of refilling a lens in eyeglasses in place of a broken lens, the spectral transmittances of the unbroken lens are measured and the spectral transmittances of a sample lens (or unmachined lens) selected based on the measurement are measured so that the respective spectral transmittances of the unbroken lens and the sample lens (or unmachined lens) are displayed simultaneously on the righthand and lefthand sides, as shown in FIG. 17, whereby a comparison is made between the spectral transmittances of the unbroken lens and the lens selected as a refill on a wavelength-by-wavelength basis (i.e., a comparison is made between color tones determined by the spectral transmittances at the individual wavelengths) to determine whether the selected lens is the same as or approximate to the unbroken lens. In this case, if the spectral transmittances of the selected one are superior, an emphasis can be placed on the superiority of the selected lens.

In this case, first and second memories M1 and M2 indicated by the broken lines in FIG. 3 are provided such that the spectral transmittances of the unbroken lens are stored in the first memory M1 and the spectral transmittances of the selected sample lens (or unmachined lens) are stored in the second memory M2. The processing circuit 37 is caused to compare the respective spectral transmittances stored in the first and second memories M1 and M2 with each other to display the result of comparison on the display screen 3a, as shown in FIG. 17. In addition, the unbroken "eyeglass lens", "R" indicative of the righthand lens or "L" indicative of the lefthand lens, and the "sample lens" or "unmachined lens" are also displayed.

This enables a customer when he or she orders the dyeing of a plastic lens to an eyeglass shop to check the difference between the plastic lens actually dyed and the plastic lens as a sample observed at the eyeglass shop.

In the case of providing a potentiometer which operates in association with the nose pad support member 9, as shown in FIG. 1, to detect from an output of the potentiometer whether the spectral transmittances under measurement are those of the lefthand lens or of the righthand lens, storing means for storing whether the spectral transmittances under measurement are those of the lefthand lens or of the righthand lens in conjunction with the measured spectral transmittances (spectral characteristics) may be provided appropriately. In this case, if one of eyeglass lenses is replaced and the spectral transmittances of a refilled lens are not the same as those of the remaining lens, the difference between the respective spectral transmittances of the right and left eyeglass lenses can be recognized.

In the case of examining a contact lens, especially a soft contact lens, the lens with high oxygen permeability is easily contaminated and therefore must be sterilization-boiled. If such a contact lens tarnishes considerably, it should be replaced. However, it is difficult to visually estimate the degree of tarnish of the contact lens. Since the degree of tarnish of the contact lens can be determined precisely by measuring the spectral transmittances (spectral characteristics) as described above, it can easily be determined whether or not it is time to replace the contact lens by measuring the spectral transmittances of the contact lens. It is also possible to set, for each eyeglass shop, a value (border line) based on which it is determined whether or not the contact lens should be replaced when the spectral transmittance reaches a certain level as the contact lens tarnishes increasingly.

Moreover, since the filter for measuring the dispersive transmittances is provided in a state capable of being inserted and removed at a midpoint of the optical path of the optical system of an existing lens meter such that the refractive characteristics of the lens under examination are measurable when the filter is removed from the optical path and that the dispersive transmittances of the lens under examination are measurable by inserting the filter in the optical path, as described above, it is unnecessary to replace the lens under examination which has been placed on the lens receiver 13 on another member for the measurement of dispersive transmittances. As a result, the measurements can be performed easily through instantaneous switching between the measurement of the refractive characteristics of the lens under examination and the measurement of the dispersive transmittances thereof. In measuring the refractive characteristics of the lens under examination at the different sites thereof and displaying the measured refractive characteristics in a mapping representation, it is also possible to display the dispersive transmittances at the individual sites of the lens under examination in precise overlapping relation with the mapping representation.

<Third Embodiment>

In a third embodiment shown in FIG. 18, the spectral transmittances can be measured by means of a normal lens meter. In FIG. 18, 101A are four LEDs as a projection light source for projecting a measuring luminous flux, which are disposed around the optical axis, 101B is a projection lens, 101F is a measurement target which is movable along the optical axis, 101C is a relay lens, 101D is a light receiving lens, and 101E is an area sensor composed of a CCD or the like.

The plane 101G on which the LEDs 101A are disposed and the position 101H at which the lens 30 to be examined is disposed are conjugate with each other relative to the projection lens 101B and the relay lens 101C. On the other hand, the measurement target 101F and the area sensor 101E are conjugate with each other relative to the relay lens 101C and the light receiving lens 101D when the lens 30 to be examined is not disposed at the placement position 101H, so that the measuring luminous flux passing through the hole (pinhole) of the measurement target 101F is converged to a point on the light receiving surface of the area sensor 101E.

Posterior to 110A, there are disposed a collimate lens 103 and a light source 104 composed of a halogen lamp or the like via a mirror 102 in this order so that the light source 104 and the plane 101G are conjugate with each other relative to the collimate lens 103. 60 is a filter disc as shown in FIG. 4 which is disposed between the projection lens 101B and the measurement target 101F.

To measure the lens characteristic of the lens 30 under examination, the lens 30 to be examined is initially set at the placement position 101H, as shown in FIG. 18(b) Then, the filter disc 60 is rotated to insert the transparent hole 60a in the optical path and the LEDs 101A are caused to emit light to project the measuring luminous flux on the lens 30 under examination. The lens 30 under examination disturbs the conjugate relationship between the measurement target 101F and the light receiving lens 101D and the measuring luminous flux passing through the hole of the measurement target 101F is no more converged to a point on the light receiving surface of the area sensor 101E.

The measurement target 101F is moved along the optical axis such that the measuring luminous flux passing through the hole of the measurement target 101F is converged to a point on the light receiving surface of the area sensor 101E. The amount Δt of travel of the measurement target 101F is calculated when the measuring luminous flux is converged to a point on the light receiving surface of the area sensor 101E, i.e., when the conjugate relationship is established between the measurement target 101F and the light receiving lens 101D and the refractive characteristics of the lens 30 under examination are calculated based on the amount Δt of travel.

Next, the emission of light from the LEDs 101A is halted, while the light source 104 is caused to emit light, and the specified one of the filter portions 61, 62, and 63 is inserted in the optical path by rotating the filter disc 60. The quantity of light received by the area sensor 101E when the specified filter portion 61, 62, and 63 is inserted in the optical path is measured and the spectral transmittance is calculated from the measured quantity of light. The spectral transmittances and the refractive characteristics are calculated by a processing circuit 37 composed of a CPU or the like, similarly to that shown in FIG. 3.

In calculating the spectral transmittances, the quantity of received light is preliminarily calculated when the specified filter portion 61, 62, and 63 is inserted in the optical path before the lens 30 to be examined is disposed at the placement position 101H. In this case, it may also be constructed such that, when a calibration switch (not shown) is pressed, the filter disc 60 is rotated to insert the specified filter portion 61, 62, and 63 in the optical path, the quantity of received light when the lens 30 to be examined is not set at the placement position 101H is measured, and the spectral transmittance at this time automatically becomes 100%.

In the third embodiment also, the lens 30 under examination need not be placed again on another member since the spectral transmittances can be measured at the position at which the refractive characteristics were measured.

<Fourth Embodiment>

Figure 19:
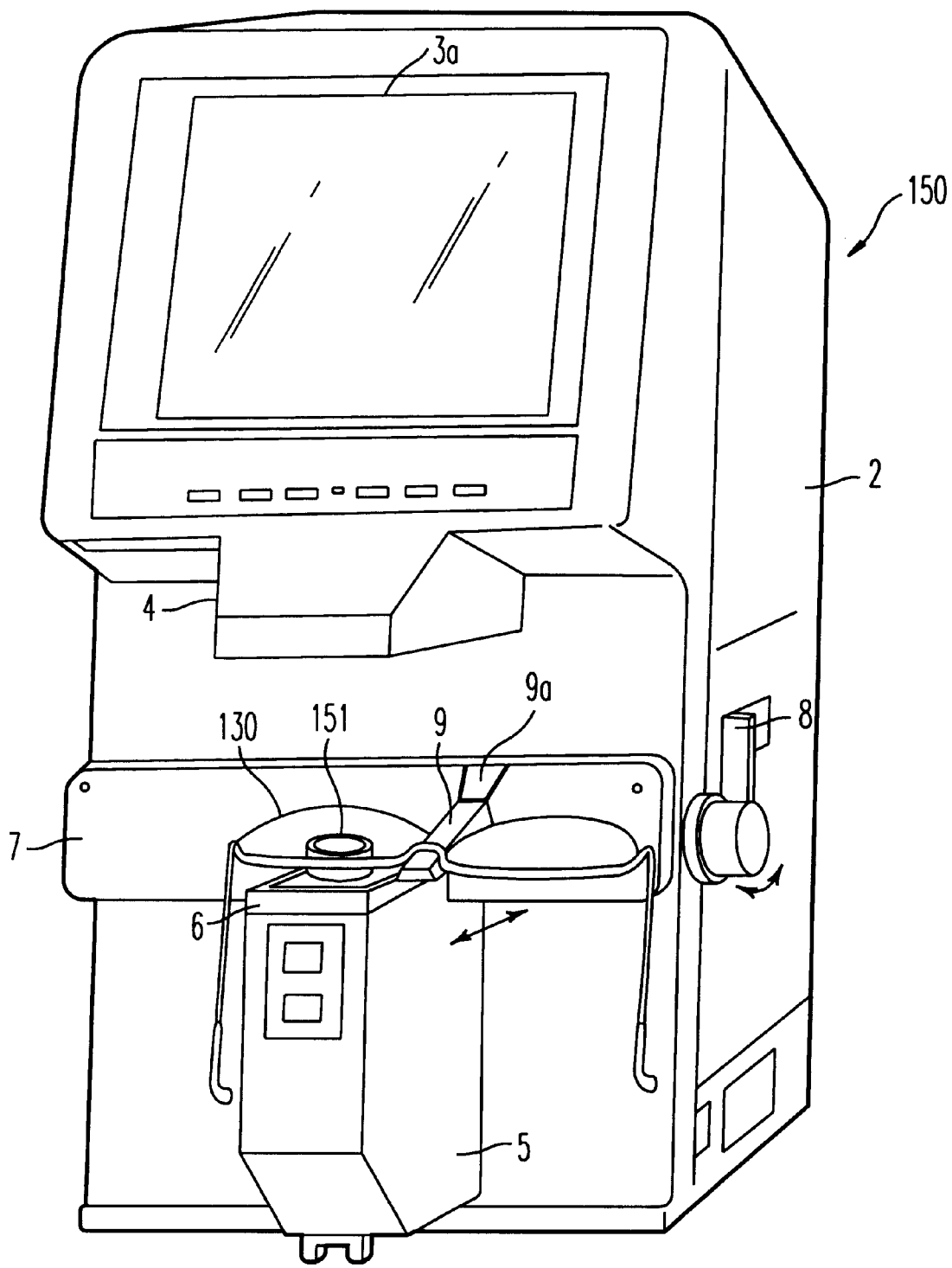
FIG. 19 is a perspective view showing the outward appearance of a lens meter according to a fourth embodiment.

FIG. 19 shows a lens meter (lens specifying apparatus) 150 according to a fourth embodiment.

Figure 20:
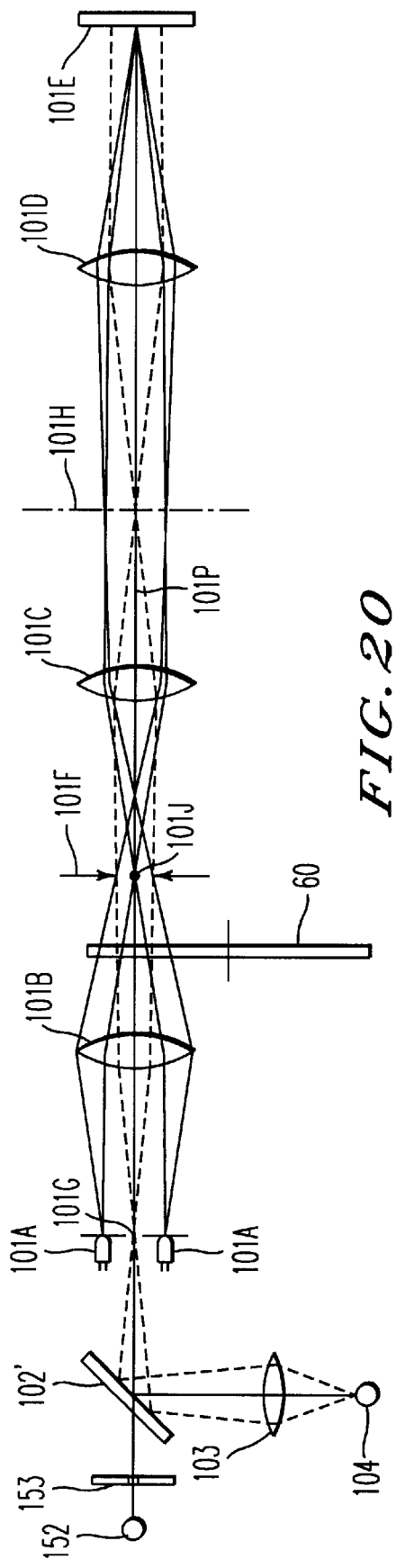
FIG. 20 is an explanatory view showing the placement of the optical system of the lens meter according to the fourth embodiment.

The lens meter 150 has an optical system as shown in FIG. 20. In FIG. 20, 102' is a half mirror, 152 is a light source for measuring the amount of prism in a lens under examination, and 153 is a pinhole plate.

Figure 21:
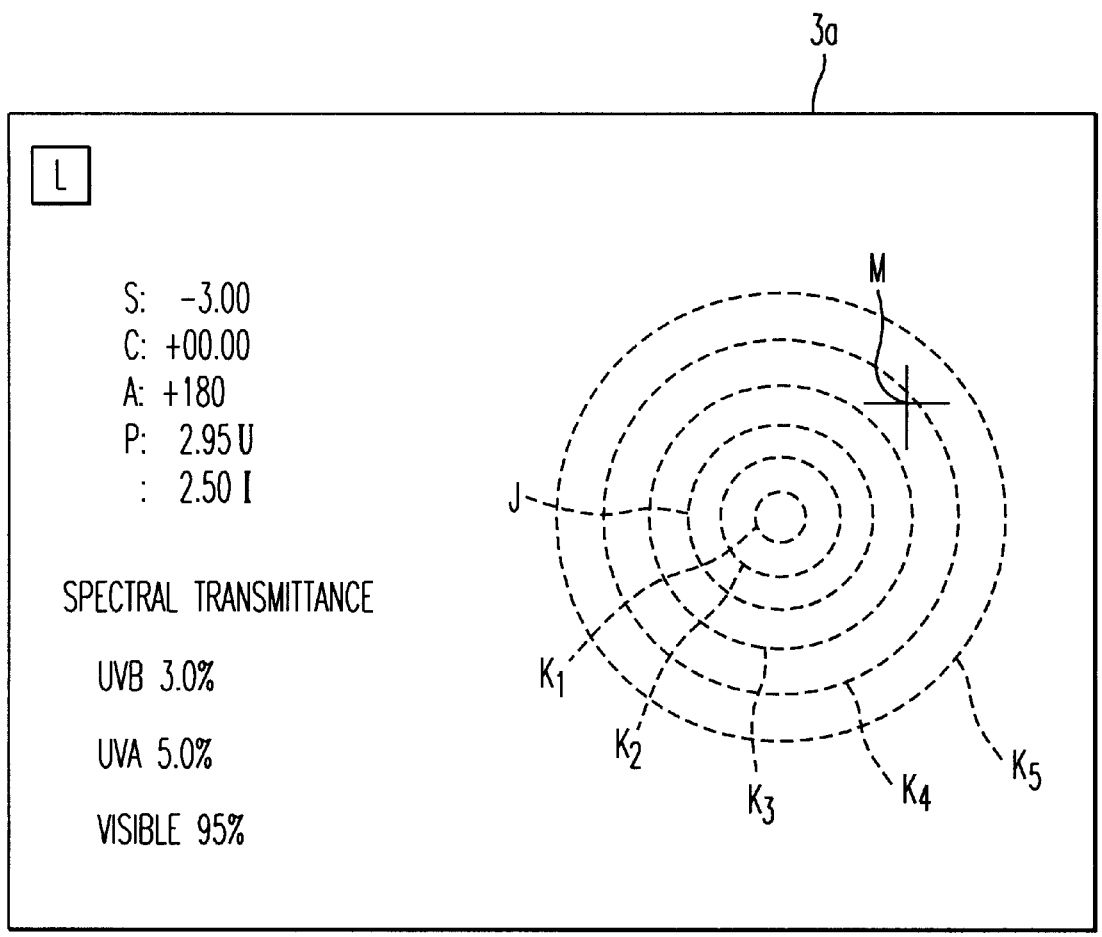
FIG. 21 is an explanatory view showing scales each representing the value of prism in the lens under examination over concentric circles and a mark indicative of the position of the axis of measuring light.

As shown in FIG. 21, the lens meter 150 displays concentric scales K1 to K5 around the optical center of the lens under examination and a crisscross mark M on the monitor screen 3a. Each of the scales K1 to K5 represents the amount of prism and the prism value decreases stepwise toward the center portion of the scales K1 to K5. The crisscross mark represents the position of a measurement optical axis 101P.

Figure 22:
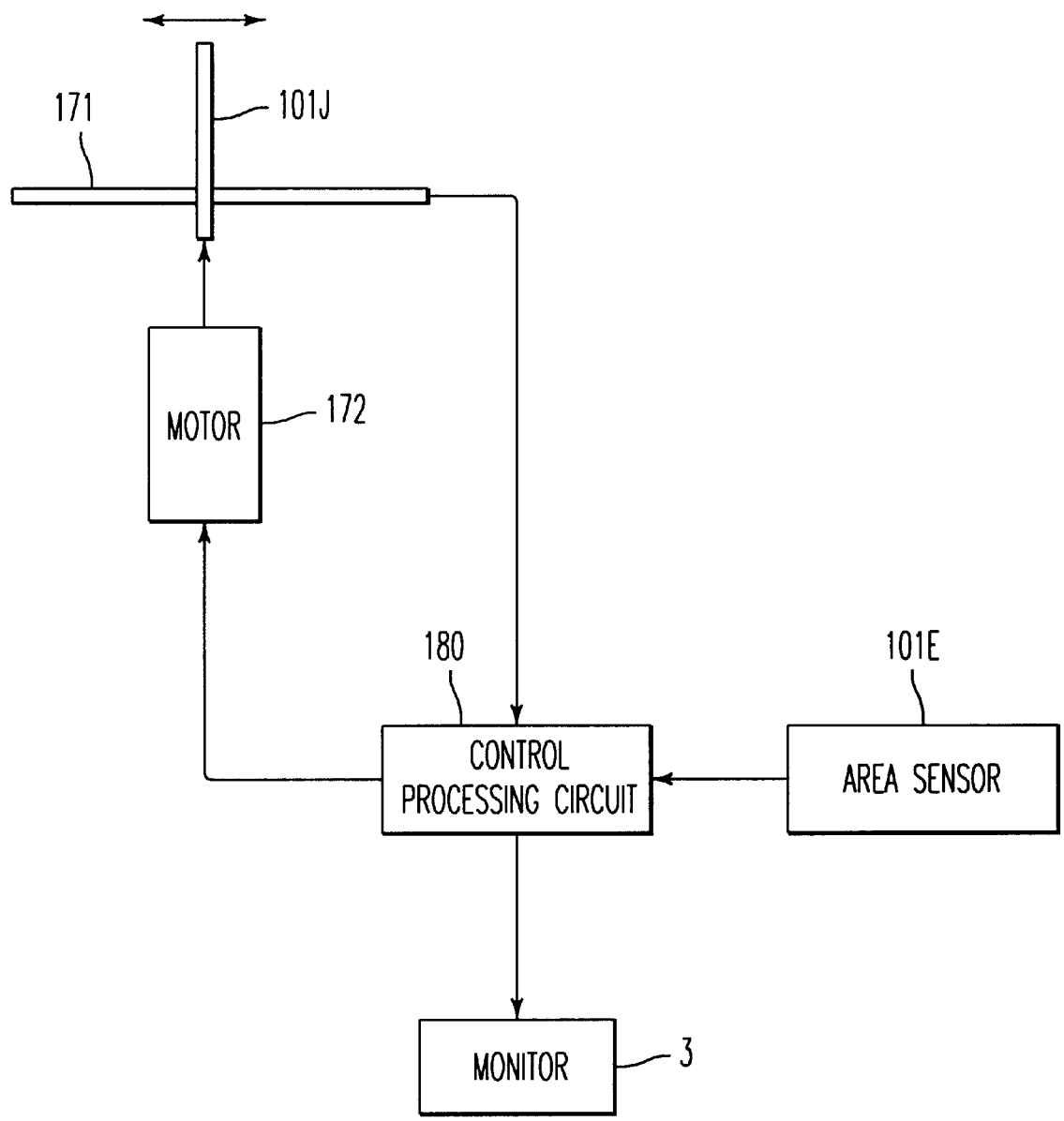
FIG. 22 is a block diagram showing the structure of a control system for moving a target.

As shown in FIG. 22, a target 101J shown in FIG. 20 moves over a guide rail 171 provided along the optical axis, which is moved by a motor 172. The motor 172 is controlled by a control processing circuit 180 based on a light receive signal from the area sensor 101E. The control processing circuit 180 calculates the optical characteristics of the lens under examination based on the amount of travel of the target 101J which has been detected by a potential meter (not shown) provided along the guide rail 171 and displays the result of calculation, the scales K1 to K5, and the crisscross mark M on the monitor 3. The potential meter is composed of, e.g., a sliding resistor and detects the amount of travel based on the resistance value of the sliding resistor.

If the lens 130 to be examined, which is a monofocal lens, is placed on the lens receiver 151 and the measuring luminous flux is projected on the lens 130 to be examined by turning on the light source 152, the measuring luminous flux transmitted by the lens 130 under examination is received by the area sensor 101E. The amount of prism at the portion of the lens 130 through which the measuring luminous flux passes is calculated on the basis of the position on the area sensor 101E at which light is received. Based on the amount of prism, the crisscross mark M indicative of the measured portion of the lens 130 under examination is displayed on the scales K1 to K5 on the monitor screen 3a.

The examiner moves the lens 130 under examination over the lens receiver 151 in the fore-to-aft and side-to-side directions such that the crisscross mark M falls within the scale K1, while monitoring the monitor screen 3a.

When the crisscross mark M falls within the scale K1, the light source 152 is turned off and the LEDs 101A are caused to emit light if the prism value falls within the limits of, e.g., ±0.5 (=K1) and such a state is maintained for 0.5 seconds or longer. The target 101J is moved such that the measuring luminous flux from the LEDs 101A converges to a point on the light receiving surface of the area sensor 101E. When the measuring luminous flux from the LEDs 101A converges to a point on the light receiving surface thereof, the movement of the target 101J is halted, the amount of travel of the target 101J detected by the potential meter is reads and the refractive characteristics "S, C, and A" of the lens 130 under examination are calculated, so that the refractive characteristics "S, C, and A" are displayed on the monitor 3.

When the refractive characteristics are calculated, the LEDs 101A are turned off, the light source 104 is caused to emit light, and the filter disk 60 is rotated to insert the specified filter portion 61, 62, and 63 in the optical path. The spectral transmittances are calculated based on the quantity of light received by the area sensor 101E and displayed on the monitor screen 3a, as shown in FIG. 21.

In the case of measuring a lens to be examined having an upper half portion colored in, e.g., gray or brown for cutting off visible light, a half mode is set and the spectral transmittances of the upper portion, eg., is measured preferentially so that the spectral transmittance of the upper portion and the spectral transmittance of the lower portion are displayed on the monitor display element 3a along with the characters of "UPPER SPECTRAL TRANSMITTANCES" and "LOWER SPECTRAL TRANSMITTANCES," respectively. Instead of the characters of "UPPER SPECTRAL TRANSMITTANCES" and "LOWER SPECTRAL TRANSMITTANCES", marks indicative of the upper and lower spectral transmittances may also be displayed.

In the case of measuring the add power of a progressive lens, there is displayed, e.g., "ADD: +3.0" instead of "S, C, A, and P"0 displayed on the righthand side of the display element 3a.

<Other Examples>

Figure 24A:
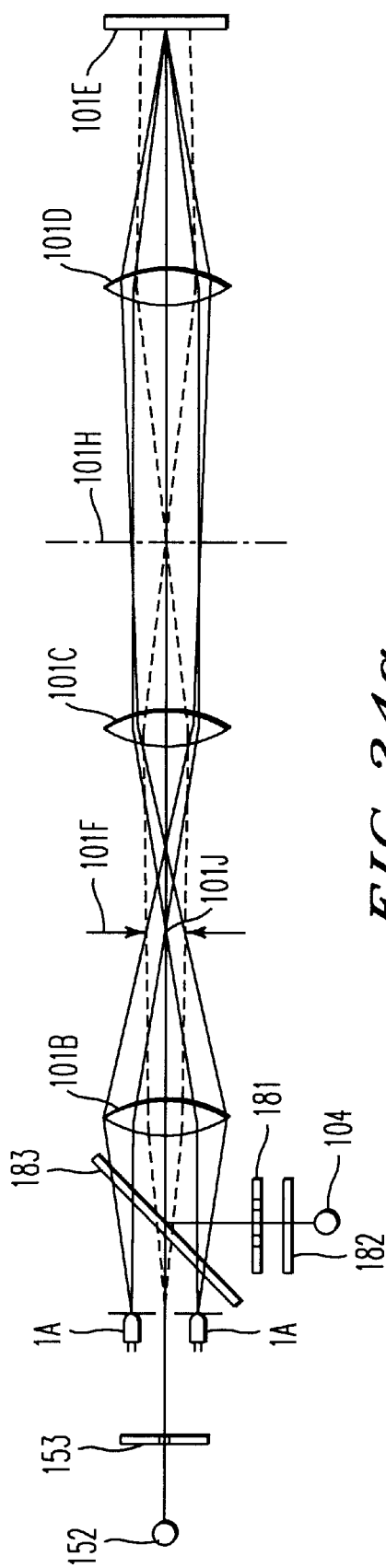
FIG. 24(A) is an explanatory view illustrating the disposition of an optical system in another example of the fourth embodiment.
Figure 24C:
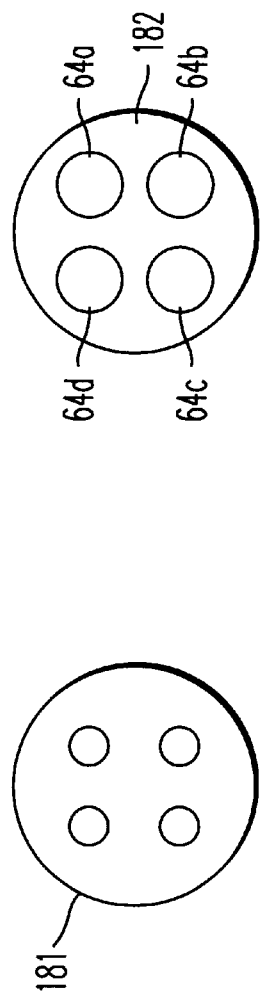
FIG. 24(C) is an explanatory view illustrating a filter plate.
Figure 24B:
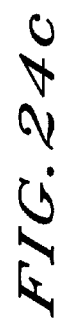
FIG. 24(B) is an explanatory view illustrating a four-hole target plate.

FIG. 24(A) shows an example in which four spectral transmittances can be measured simultaneously and a four-hole target plate 181 formed with four holes and a filter plate 182 as shown in FIG. 24(B) are provided in place of the filter plate 60. As shown in FIG. 24(C), the filter plate 182 is provided with the filter portions 64a to 64d shown in FIG. 8. 183 is a half mirror.

FIG. 25(A) shows another example in which a rotating plate 187 is provided with a pinhole 188 and a filter plate portion 189 which is provided with the filter portions 64a to 64d, as shown in FIG. 25(B). The rotating plate 187 moves along a shaft 190 by means of a motor not shown and rotates with the rotation of the shaft 190. The shaft 190 is rotated by a motor 191.

In the other example, the target 101F and the filter disc 60 are combined with each other and, when the refractive characteristics are measured, the pinhole 188 of the rotating plate 187 is inserted in the optical path so that the rotating plate 187 moves along the optical axis. When the spectral transmittances are measured, the filter plate portion 189 of the rotating plate 187 is inserted in the optical path.

<Fifth Embodiment>

Figure 26:
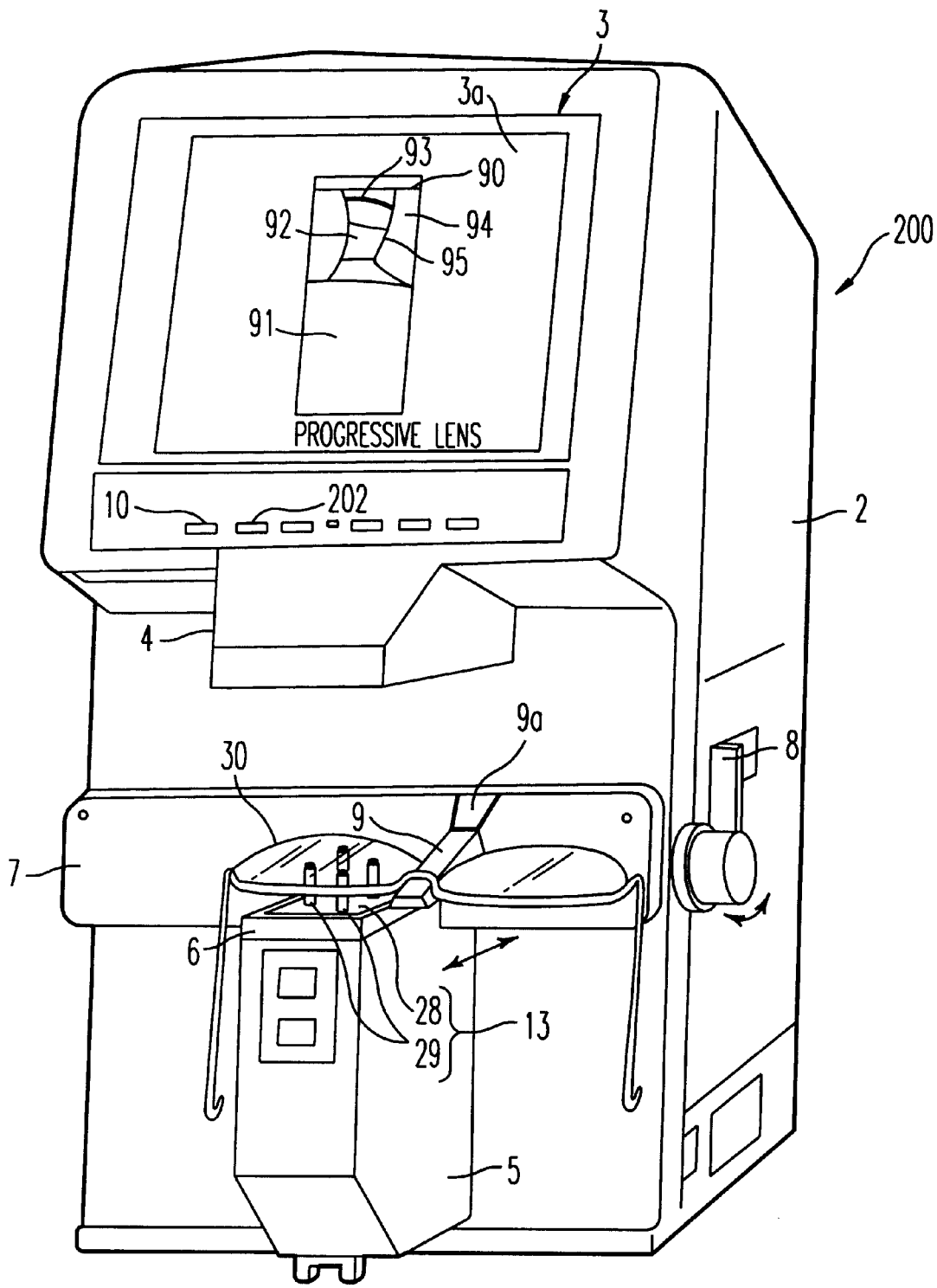
FIG. 26 is a perspective view showing the outward appearance of a lens meter according to a fifth embodiment.

FIG. 26 shows a lens meter 200 according to a fifth embodiment. The lens meter 200 is provided with: a first mode switch 201 for setting a refractive characteristic mode (first mode) in which refractive characteristics are measured; a second mode switch 202 for setting a spectral measurement mode (second mode) in which spectral transmittances are measured; and a third mode switch 203 for setting an optical spectral mode (third mode) in which the refractive characteristics and spectral transmittances are measured. The lens meter 200 comprises the same optical system, the processing circuit 37, and the like as shown in FIG. 3.

In the first and second modes, the refractive characteristics and spectral transmittances are measured similarly to the first embodiment, so that the description thereof will be omitted.

Figure 27:
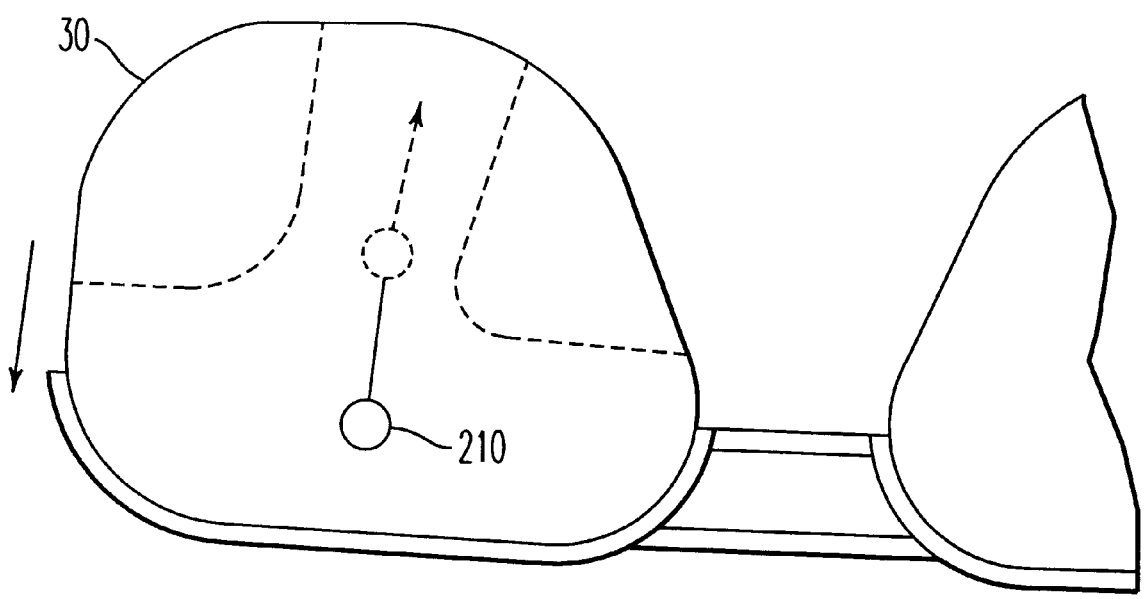
FIG. 27 is an explanatory view showing an aiming light beam being projected on a lens under examination.

When the third mode is set, the lens 30 to be examined is placed on the lens receiver 13, a light-source lighting switch (not shown) is turned on, the light source 23 is lit, and the lens 30 under examination is illuminated with an aiming light beam 210 as shown in FIG. 27, so that the position of the axis of measuring light is recognizable under the radiation of the aiming light beam 210.

The lens 30 under examination is moved in the fore-to-aft and side-to-side directions over the lens receiver 13 such that the aiming light beam 210 is positioned in the distance viewing zone of the lens 30 under examination. When the aiming light beam 210 is positioned in the distance viewing zone of the lens 30 under examination, as shown in FIG. 27, a measurement initiation switch not shown is turned on: Then, the transparent hole 60a of the filter disc 60 is inserted in the optical path and the light source 21 is lit so that the measuring luminous flux P2 (see FIG. 3) is projected on the lens 30 under examination, while the scales K1 to K5 are displayed on the monitor screen 3a, as shown in FIG. 21.

Figure 28:
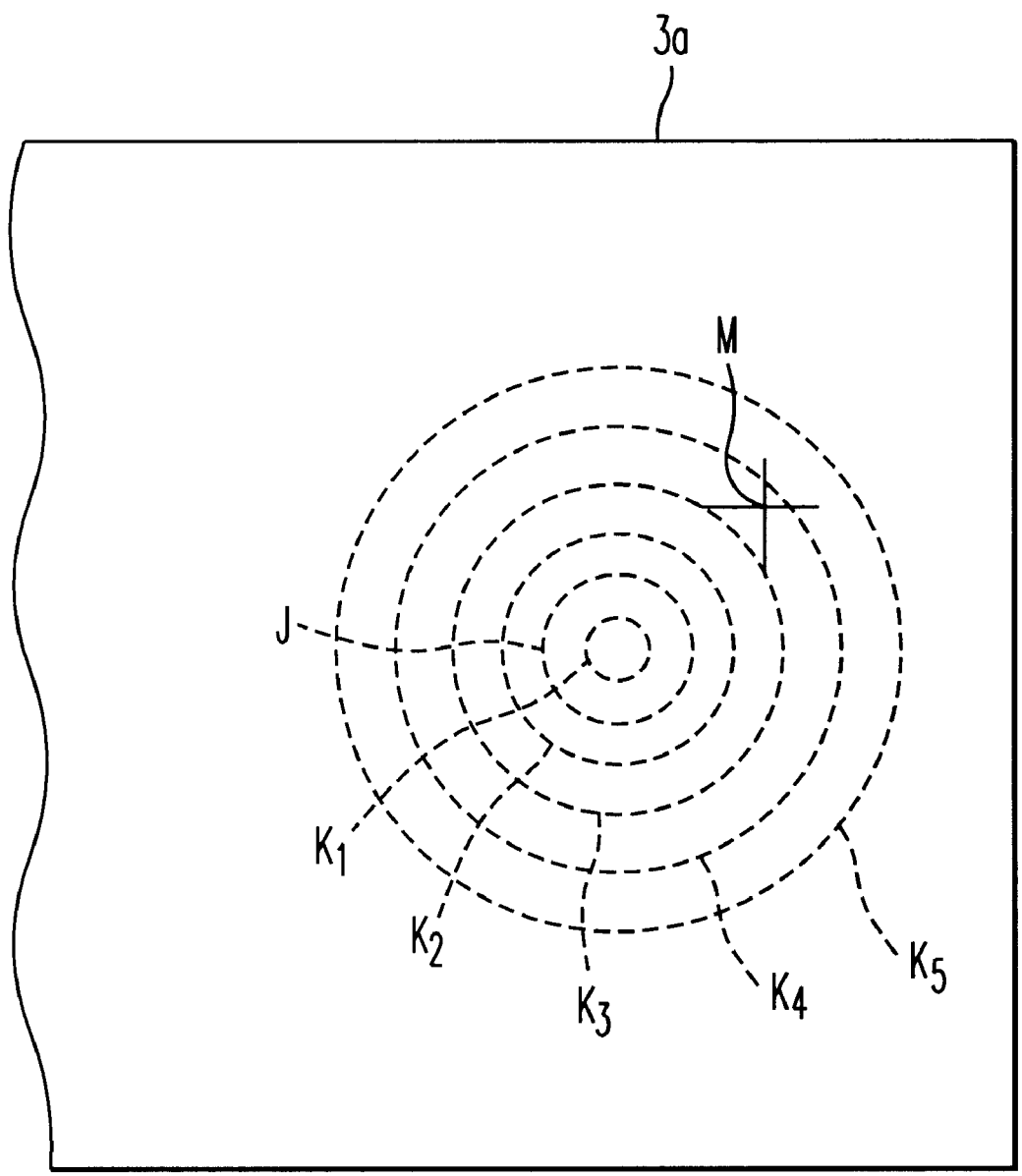
FIG. 28 is an explanatory view showing concentric scales around the optical center of the lens under examination and a mark showing the position of the axis of measuring light.

The measuring luminous flux P2 transmitted by the lens 30 under examination reaches the area CCD 35 via the pattern plate 28, the screen 32, the mirror 33, and the image forming lens 34 and the images of the small holes of the pattern plate 28 are formed on the CCD 35. The amount of prism at the portion of the lens 30 through which the aiming light beam passes is calculated on the basis of the positions of the images of the small holes on the area CCD 35 and, based on the amount of prism, the crisscross mark M indicative of the measured portion of the lens 30 under examination is displayed on the Scales K1 to K5 on the monitor screen 3a, as shown in FIG. 28.

The examiner moves the lens 30 under examination over the lens receiver 13 in the fore-to-aft and side-to-side directions such that the crisscross mark M falls within the scale K1, while monitoring the monitor screen 3a.

Figure 29:
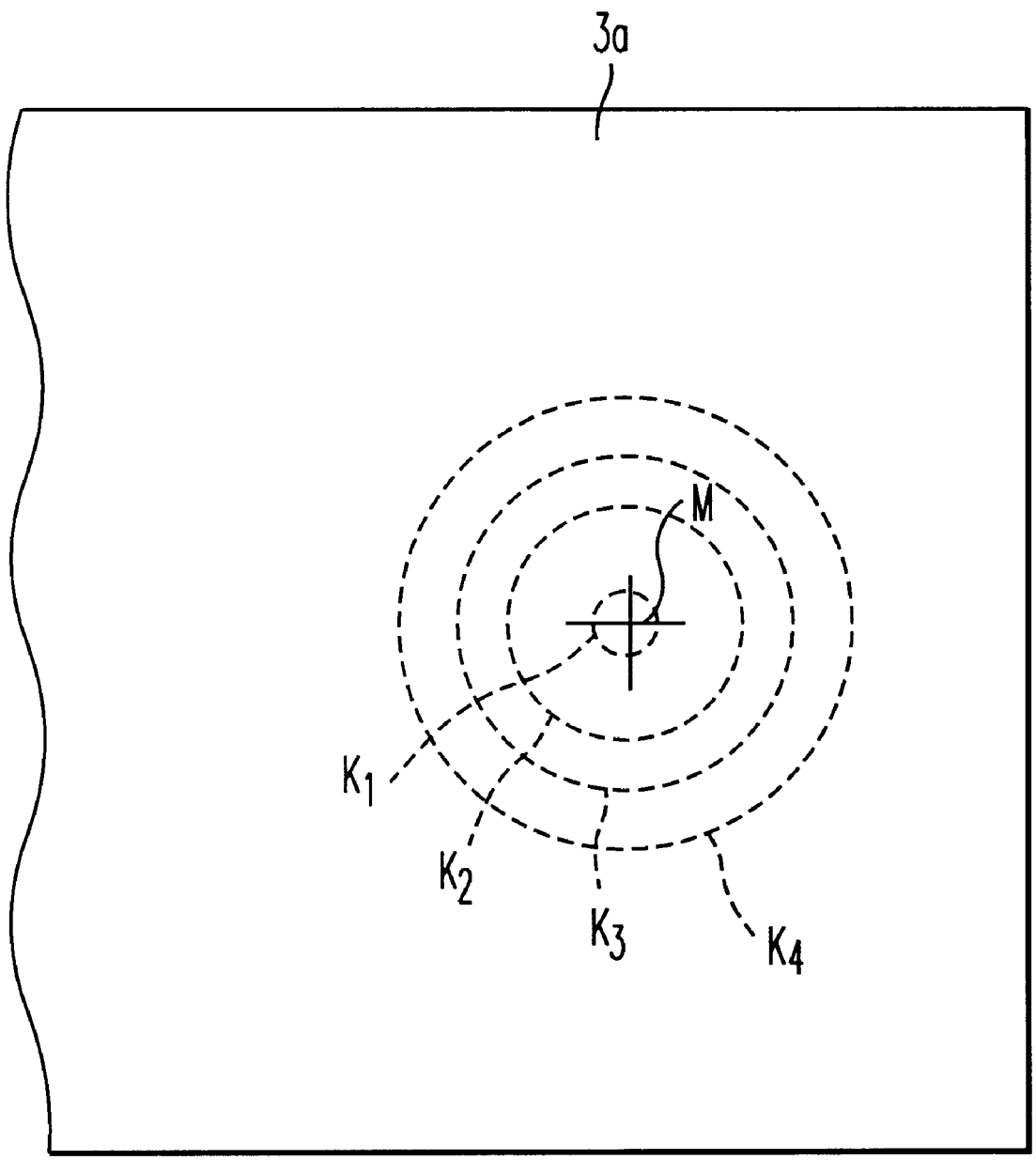
FIG. 29 is an explanatory view showing the mark being coincident with the scale at the center portion.
Figure 30:
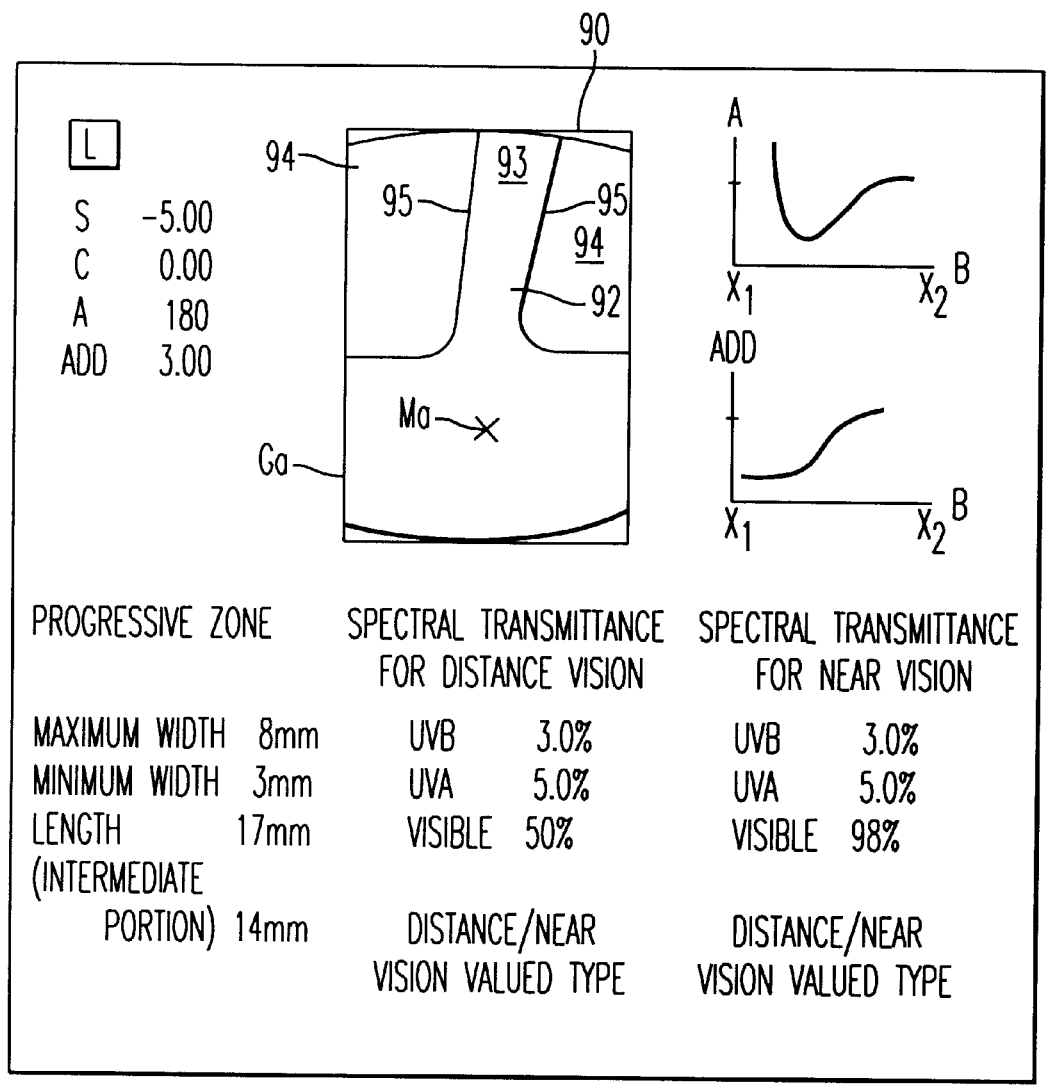
FIG. 30 is an explanatory view showing an example of display on the monitor screen.

As shown in FIG. 29, when the crisscross mark M falls within the scale K1, the optical characteristics "S, C, and A" of the lens 30 under examination at a distance viewing point thereon are measured and displayed on the monitor screen 3a. When the measurement of the optical characteristics is completed, the filter disk 60 is rotated to insert the specified filter portion 61, 62, or 63 in the optical path and the spectral transmittances at the distance viewing point are measured so that the spectral transmittances at the distance viewing point are displayed on the monitor screen 3a along with the characters of "SPECTRAL TRANSMITTANCES FOR DISTANCE VISION".

When the measurement of the spectral transmittances is completed, the filter disk 60 is rotated to insert again the transparent hole 60a in the optical path. The lens 30 under examination is then moved such that the aiming light beam 210 moves toward a near viewing zone. When the aiming light beam 210 enters a progressive zone, the add power of the progressive zone is calculated and the add power is displayed on the monitor screen 3a.

When the add power becomes maximum, an add power memory switch (not shown) is pressed so that the add power at this time is displayed on the monitor screen 3a as the maximum add power. When the add power memory switch is pressed, the filter disc 60 is rotated to insert the specified filter portion 61, 62, or 63 in the optical path and the spectral transmittances at a near viewing point is measured, so that the spectral transmittances at the near viewing point are displayed on the monitor screen 3a along with the characters of "SPECTRAL TRANSMITTANCES FOR NEAR VISION". Instead of the characters of "SPECTRAL TRANSMITTANCES FOR DISTANCE VISION" and "SPECTRAL TRANSMITTANCES FOR NEAR VISION", marks indicative thereof may also be used.

Although the spectral transmittances are measured when the add power memory switch is pressed in the fifth embodiment, the spectral transmittances may also be measured automatically when the add power lowers from the maximum value by a specified value.

The aiming light beam 210 can easily be caused to enter the progressive zone of the lens 30 under examination by displaying an optical axis mark Ma indicative of the position of the axis of measurement light on a distribution image Ga displayed on the display screen 3a of the monitor 3, providing a potentiometer at the lens pad 7 and the slider 9a so that the amounts of travel of the lens 30 under examination in the X and Y directions are detected by means of the potentiometer, shifting the optical axis mark Ma over the distribution image Ga based on the detected amounts of travel, and moving the lens 30 under examination while monitoring the shifting position of the optical axis mark Ma.

<Advantages of the Invention>

As described above, according to the present invention, the spectral transmittances of lens can easily and promptly be measured by using the optical path of the measurement optical as system of the lens under examination. As a result, even when one of the right and left eyeglass lenses is broken and the other unbroken lens is to be replaced, comprehensive determination allows the right and left eyeglass lenses to be best balanced.

What is claimed is:

1. A lens specifying apparatus comprising:
    a lens measuring device having a measurement optical system configured to measure a refractive characteristic of a lens under examination;
    a spectral characteristic measuring device having a part of an optical path in common with the measurement optical system and configured to measure a spectral transmittance of the lens under examination; and
    a display device configured to display the spectral transmittance of the lens under examination measured by the spectral characteristic measuring device;

wherein the display device is configured to display in three dimensions the spectral transmittance at each site of a lens configuration representing the lens under examination over the corresponding site of the lens configuration based on spectral data obtained by moving the lens under examination in fore-to-aft and side-to-side directions.

2. A lens specifying apparatus comprising:

a) a lens measuring device having a measurement optical system configured to measure a refractive characteristic of a lens under examination;

b) a spectral characteristic measuring device having a part of an optical path in common with the measurement optical system and configured to measure a spectral transmittance of the lens under examination; and c) a display device configured to display the spectral transmittance of the lens under examination measured by the spectral characteristic measuring device;

wherein the lens measuring device includes:

a light source configured to project a measuring light beam on the lens under examination;

an image receiving element configured to receive the measuring light beam transmitted by the lens under examination;

a transmission wavelength selecting device disposed, as a part of the spectral characteristic measuring device, at a midpoint of the optical path extending from the light source to the image receiving element to obtain the spectral transmittance; and a processing circuit configured to obtain, from an output of the image receiving element, the refractive characteristic of the lens under examination and the spectral transmittance thereof.

3. The lens specifying apparatus according to claim 2, wherein the transmission wavelength selecting device includes:

a rotating plate provided with a plurality of filter portions configured to cut off light in different wavelength ranges, respectively, one of the filter portions being inserted in the optical path with the rotation of the rotating plate.

4. The lens specifying apparatus according to claim 2, wherein the transmission wavelength selecting device includes:

a rotating plate provided with an aperture and a filter portion, the filter portion being provided with a plurality of filters configured to cut off light in different wavelength ranges, respectively, the aperture or filter portion being selectively inserted in the optical path with the rotation of the rotating plate.

5. A lens specifying apparatus comprising:

a) a lens measuring device having a measurement optical system configured to measure a refractive characteristic of a lens under examination;

b) a spectral characteristic measuring device having a part of an optical path in common with the measurement optical system and configured to measure a spectral transmittance of the lens under examination; and c) a display device configured to display the spectral transmittance of the lens under examination measured by the spectral characteristic measuring device;

wherein the display device is configured to display, as a bar graph, the spectral transmittance in each of the wavelength ranges.

6. The lens specifying apparatus according to any one of claims 2 to 4, wherein:

the display device is configured to display in three dimensions the spectral transmittance at each site of a lens configuration representing the lens under examination over the corresponding site of the lens configuration based on spectral data obtained by moving the lens under examination in fore-to-aft and side-to-side directions.

7. A lens specifying apparatus comprising:

a) a lens measuring device having a measurement optical system configured to measure a refractive characteristic of a lens under examination;

b) a spectral characteristic measuring device having a part of an optical path in common with the measurement optical system and configured to measure a spectral transmittance of the lens under examination; and c) a display device configured to display the spectral transmittance of the lens under examination measured by the spectral characteristic measuring device;

wherein, if the upper and lower parts of the lens under examination have different spectral transmittances, the display device displays the spectral transmittance of the upper part along with a mark or character indicative of the upper part and the spectral transmittance of the lower part along with a mark or character indicative of the lower part.

8. A lens specifying apparatus comprising:

a) a lens measuring device having a measurement optical system configured to measure a refractive characteristic of a lens under examination;

b) a spectral characteristic measuring device having a part of an optical path in common with the measurement optical system and configured to measure a spectral transmittance of the lens under examination; and c) a display device configured to display the spectral transmittance of the lens under examination measured by the spectral characteristic measuring device;

wherein the spectral transmittance is measured automatically when the lens under examination is moved in fore-to-aft and side-to-side directions and an optical axis of the lens under examination is located adjacent an optical axis of the measurement optical system.

9. A lens specifying apparatus comprising:

a) a lens measuring device having a measurement optical system configured to measure a refractive characteristic of a lens under examination;

b) a spectral characteristic measuring device having a part of an optical path in common with the measurement optical system and configured to measure a spectral transmittance of the lens under examination; and c) a display device configured to display the spectral transmittance of the lens under examination measured by the spectral characteristic measuring device;

wherein, if the lens under examination is a multifocal progressive lens, the spectral transmittance measured in a distance viewing zone and the spectral transmittance measured in a near viewing zone are distinguishably displayed by the display device.

10. A lens specifying apparatus comprising:

a) a lens measuring device having a measurement optical system configured to measure a refractive characteristic of a lens under examination;

b) a spectral characteristic measuring device having a part of an optical path in common with the measurement optical system and configured to measure a spectral transmittance of the lens under examination; and c) a display device configured to display the spectral transmittance of the lens under examination measured by the spectral characteristic measuring device;

wherein, if the lens under examination is a multifocal progressive lens:

the lens under examination is moved over a lens receiver to shift an optical axis of the measurement optical system from a distance viewing zone of the lens under examination to a near viewing zone thereof, an add power of a progressive zone of the lens under examination is calculated and displayed on a display element when the measurement optical axis enters the progressive zone, and the spectral transmittance of the near viewing zone is measured when an add power memory switch is pressed.

11. A lens specifying apparatus comprising:

a) a lens measuring device having a measurement optical system configured to measure a refractive characteristic of a lens under examination;

b) a spectral characteristic measuring device having a part of an optical path in common with the measurement optical system and configured to measure a spectral transmittance of the lens under examination; and c) a display device configured to display the spectral transmittance of the lens under examination measured by the spectral characteristic measuring device;

wherein, if the lens under examination is a multifocal progressive lens:

the lens under examination is moved to shift an optical axis of the measurement optical system from a distance viewing zone of the lens under examination to a near viewing zone thereof, an add power of a progressive zone of the lens under examination is calculated end displayed on a display element when the measurement optical axis enters the progressive zone, and the spectral transmittance of the near viewing zone is automatically measured when the add power slightly lowers from a maximum value.

* * * * *

UNITED STATES PATENT AND TRADEMARK OFFICE
CERTIFICATE OF CORRECTION

PATENT NO.     : 6,359,684 B2                                          Page 1 of 1
DATED          : March 19, 2002
INVENTOR(S)    : Yukio Ikezawa et al.

It is certified that error appears in the above-identified patent and that said Letters Patent is hereby corrected as shown below:

<u>Title page, Item [54] and Column 1, line 1,</u>
Title should read:
-- [54]  LENS SPECIFYING APPARATUS --

Signed and Sealed this

Twenty-fifth Day of February, 2003

JAMES E. ROGAN
*Director of the United States Patent and Trademark Office*